(12) United States Patent
Bera et al.

(10) Patent No.: US 11,874,773 B2
(45) Date of Patent: Jan. 16, 2024

(54) APPARATUSES, METHODS, AND SYSTEMS FOR DUAL SPATIAL PATTERN PREFETCHER

(71) Applicant: Intel Corporation, Santa Clara, CA (US)

(72) Inventors: Rahul Bera, Bangalore (IN); Anant Vithal Nori, Banglore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 731 days.

(21) Appl. No.: 16/729,344

(22) Filed: Dec. 28, 2019

(65) Prior Publication Data

US 2021/0089456 A1    Mar. 25, 2021

Related U.S. Application Data

(60) Provisional application No. 62/903,550, filed on Sep. 20, 2019.

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
CPC ............................................... G06F 2212/602
See application file for complete search history.

(56) References Cited

U.S. PATENT DOCUMENTS 6,516,388 B1    2/2003  McCormick et al.
6,529,998 B1 *  3/2003  Yochai ................ G06F 12/0862
                                              711/213

(Continued)

OTHER PUBLICATIONS

Extended European Search Report, EP App. No. 20179004.5, dated Nov. 27, 2020, 8 pages.

*Primary Examiner* — William E. Baughman
(74) *Attorney, Agent, or Firm* — NICHOLSON DE VOS WEBSTER & ELLIOTT LLP

(57) ABSTRACT

Systems, methods, and apparatuses relating to a dual spatial pattern prefetcher are described. In one embodiment, a prefetch circuit is to prefetch a cache line into a cache from a memory by tracking page and cache line accesses to the cache for a single access signature, generate a spatial bit pattern, for the cache line accesses for each page of a plurality of pages, that is shifted to a first cache line access for each page, generate a single spatial bit pattern for the single access signature for each of the spatial bit patterns that have a same spatial bit pattern to form a plurality of single spatial bit patterns, perform a logical OR operation on the plurality of single spatial bit patterns to create a first modulated bit pattern for the single access signature, perform a logical AND operation on the plurality of single spatial bit patterns to create a second modulated bit pattern for the single access signature, receive a prefetch request for the single access signature, and perform a prefetch operation for the prefetch request using the first modulated bit pattern when a threshold is not exceeded and the second modulated bit pattern when the threshold is exceeded.

24 Claims, 19 Drawing Sheets

(56) References Cited

U.S. PATENT DOCUMENTS

| | | | |
|---|---|---|---|
| 6,968,430 B1* | 11/2005 | Kashyap | G06F 9/3816 |
| | | | 712/210 |
| 2006/0041723 A1* | 2/2006 | Hakura | G06F 12/0862 |
| | | | 711/213 |
| 2012/0084497 A1 | 4/2012 | Subramaniam et al. | |
| 2014/0149679 A1* | 5/2014 | Rowlands | G06F 12/0862 |
| | | | 711/137 |
| 2014/0379995 A1* | 12/2014 | Kwon | G06F 12/0862 |
| | | | 711/137 |
| 2016/0065973 A1* | 3/2016 | Cote | H04N 19/176 |
| | | | 375/240.16 |
| 2017/0192893 A1* | 7/2017 | Gschwind | G06F 12/0862 |
| 2018/0046578 A1* | 2/2018 | Liu | G06F 12/1009 |
| 2018/0329822 A1* | 11/2018 | Brekelbaum | G06F 12/0875 |
| 2018/0329823 A1* | 11/2018 | Brekelbaum | G06F 12/0862 |
| 2020/0142698 A1* | 5/2020 | Karve | G06F 9/30047 |

* cited by examiner

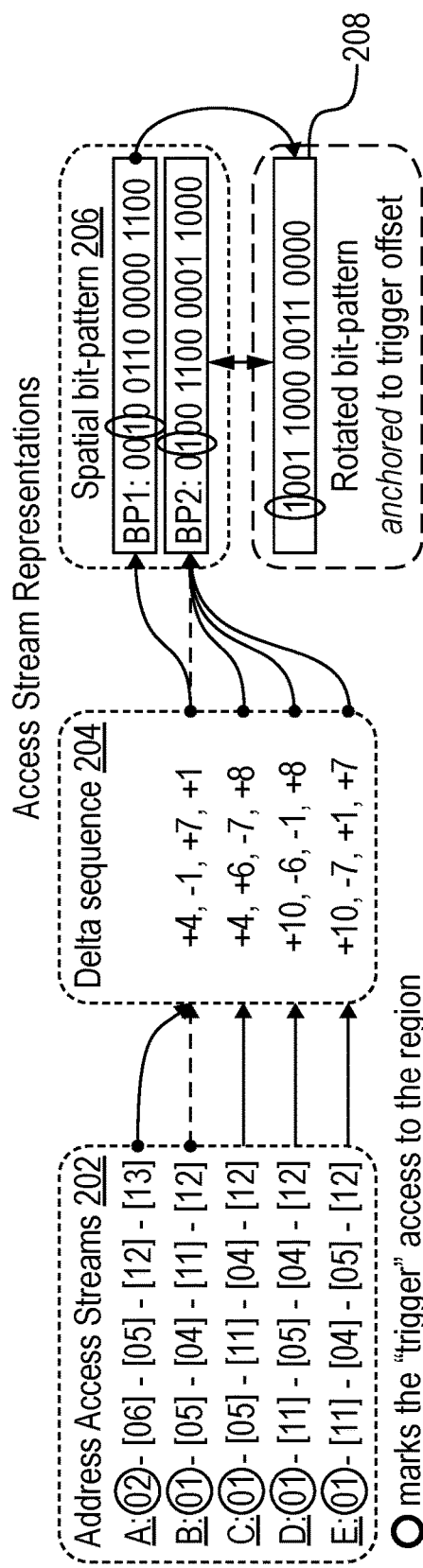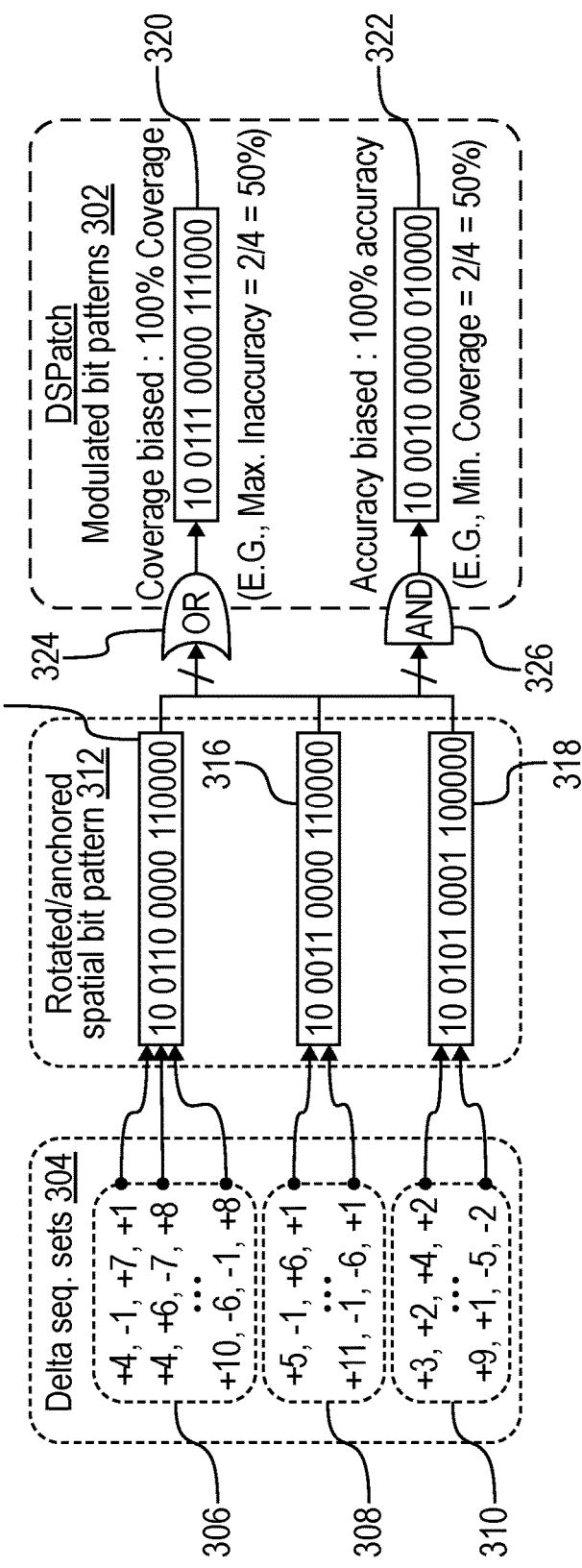

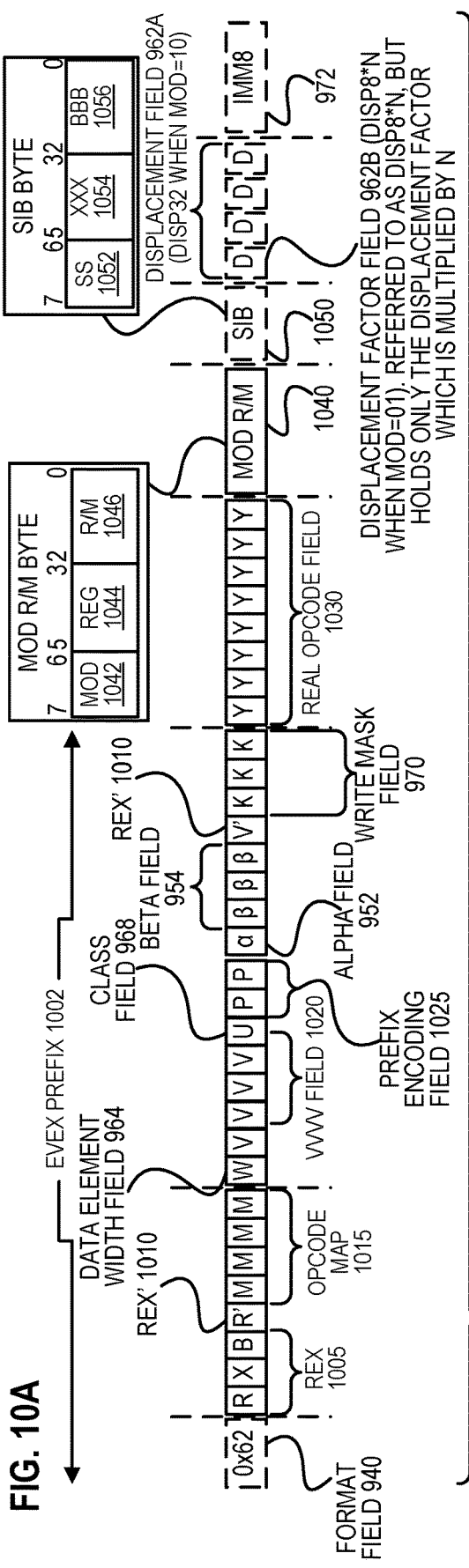
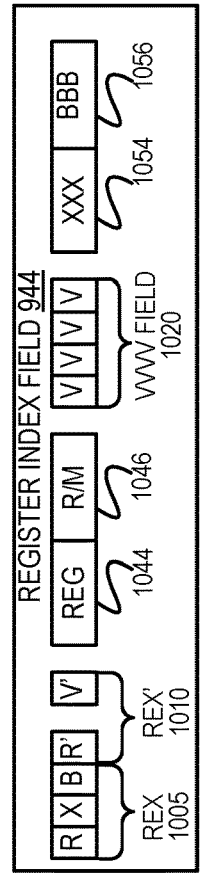
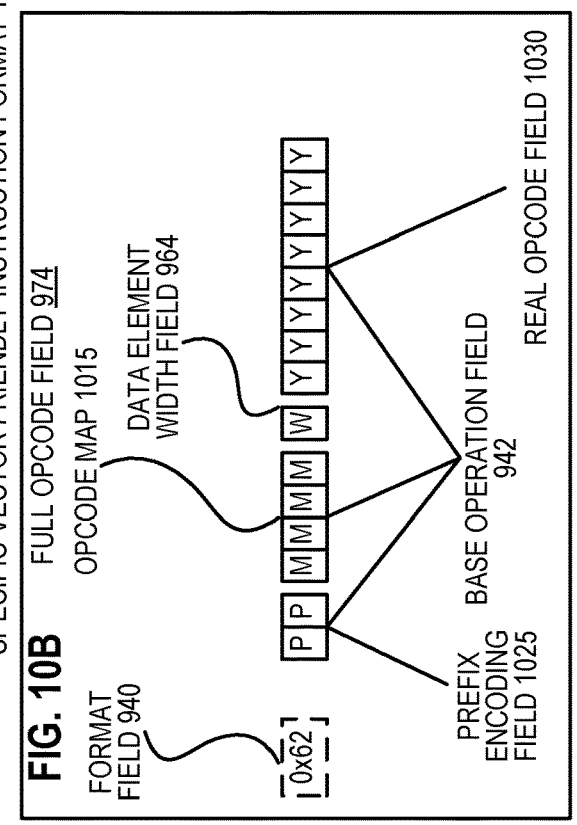
FIG. 10A
FIG. 10B
FIG. 10C

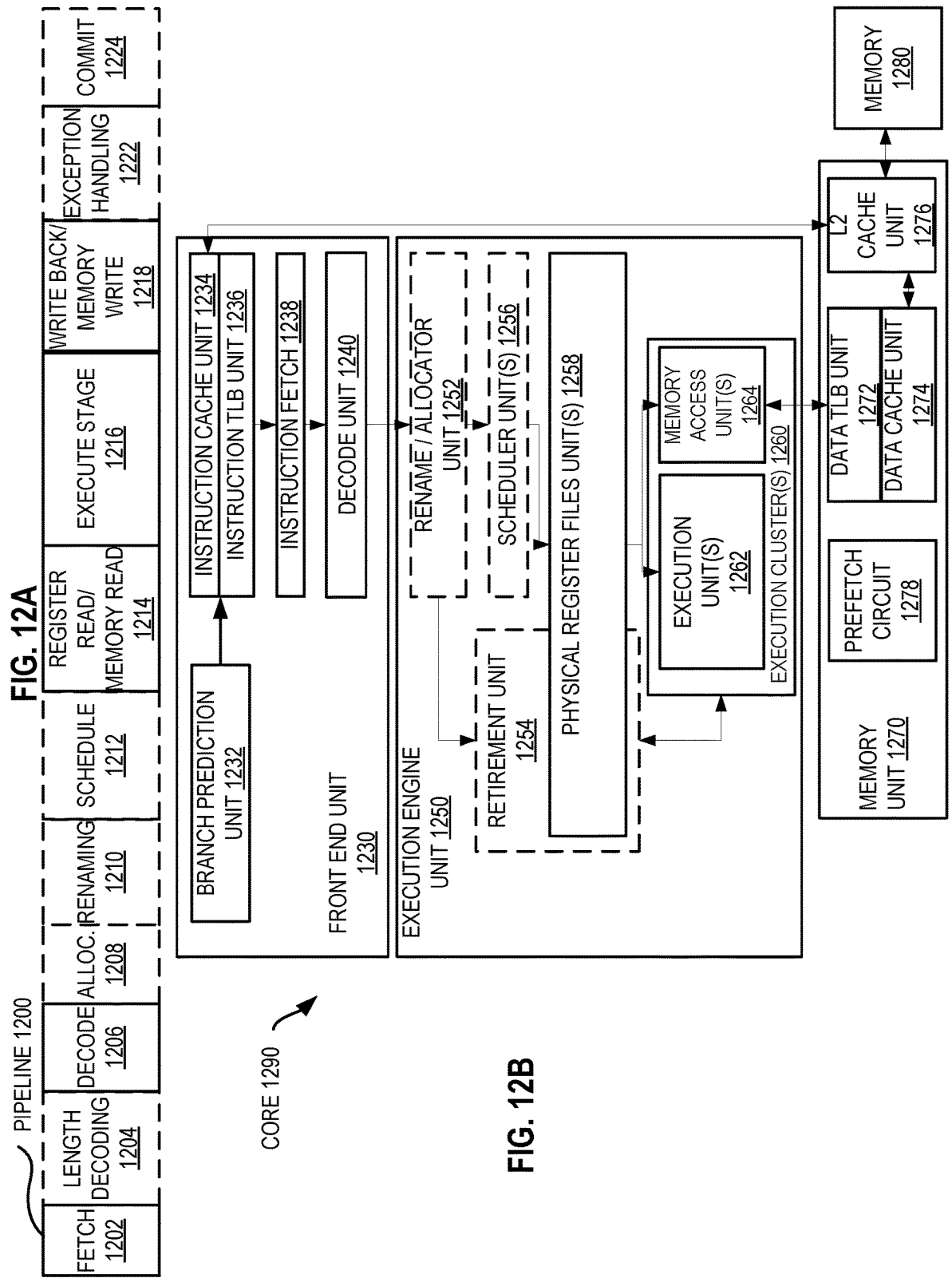

APPARATUSES, METHODS, AND SYSTEMS FOR DUAL SPATIAL PATTERN PREFETCHER

CROSS-REFERENCE TO RELATED APPLICATIONS

The present patent application claims the benefit of U.S. Provisional Patent Application No. 62/903,550, filed Sep. 20, 2019, and titled: "Apparatuses, Methods, and Systems for Dual Spatial Pattern Prefetcher", which is incorporated herein by reference in its entirety.

TECHNICAL FIELD

The disclosure relates generally to electronics, and, more specifically, an embodiment of the disclosure relates to a dual spatial pattern prefetch circuit.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 2 illustrates spatial bit patterns, anchored to a trigger access, that capture local and global deltas according to embodiments of the disclosure.

FIG. 3 illustrates modulated bit patterns according to embodiments of the disclosure.

FIG. 10A is a block diagram illustrating fields for the generic vector friendly instruction formats in FIGS. 9A and 9B according to embodiments of the disclosure.

FIG. 10B is a block diagram illustrating the fields of the specific vector friendly instruction format in FIG. 10A that make up a full opcode field according to one embodiment of the disclosure.

FIG. 10C is a block diagram illustrating the fields of the specific vector friendly instruction format in FIG. 10A that make up a register index field according to one embodiment of the disclosure.

FIG. 12A is a block diagram illustrating both an exemplary in-order pipeline and an exemplary register renaming, out-of-order issue/execution pipeline according to embodiments of the disclosure.

FIG. 12B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
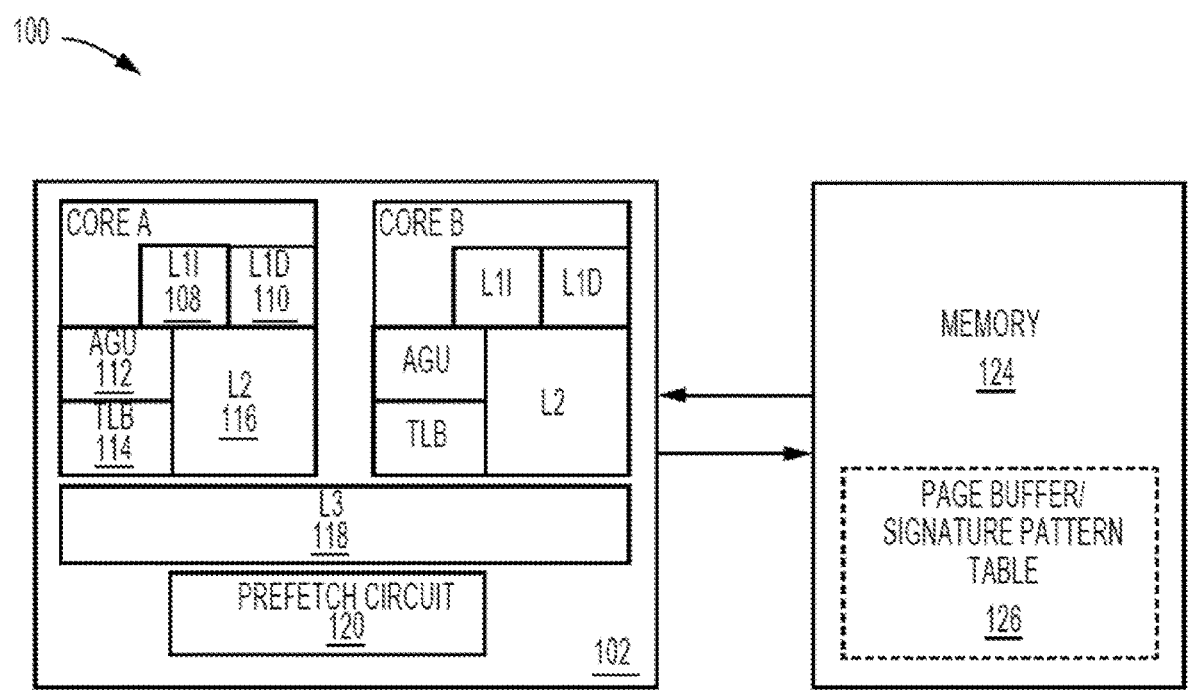
FIG. 1 illustrates a block diagram of a multiple core hardware processor with a prefetch circuit according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor may use a prefetcher (e.g., prefetch circuit) to prefetch data, for example, to predict access addresses and bring the data for those addresses into a cache or caches (e.g., from memory, such as, but not limited to dynamic random access memory (DRAM)).

High latency accesses, e.g., from the DRAM main memory, often stall the in-order retire of instructions of a processor (e.g., core) and reduce look-ahead for instruction-level-parallelism (ILP) extraction. Furthermore, while memory bandwidths increase with newer generations of DRAM, memory latencies increase as well in certain embodiments. A move to narrower channels (e.g., in Low-Power Double Data Rate (LPDDR) DRAM) also increases overall latency from DRAM. The embodiments herein overcome these problems through a novel address prediction mechanism that is simultaneously optimized for both prefetch coverage and accuracy at low storage costs and scales up the performance provided when memory bandwidth headroom increases.

There are various solutions to the memory wall limit on performance. These include increasing processor depth which adds tolerance to higher latency (a complex and expensive approach with effectiveness reduced when increasing processor width as well), on-die caches with low access latencies (bound by capacity/area of cache) and prefetching or predicting addresses required by loads in a program (bound by ability to predict a large portion of load addresses early). A high-performance processor may employ a combination of some or all of these solutions.

Certain embodiments herein focus on prefetching to improve processor performance. The main metrics of prefetching may generally be as follows:

Coverage: The fraction of high latency accesses by the program saved by the prefetcher (e.g., the higher the better), Timeliness: The fraction of high latency access hidden by the prefetch (e.g., the more the better), Accuracy: The fraction of correctly predicted addresses by the prefetcher (e.g., the higher the better), and Storage: The storage requirements of the prefetcher (e.g., the smaller the better).

In certain embodiments, prefetchers need to simultaneously optimize for coverage, timeliness and accuracy while maintaining low storage cost. Certain prefetching techniques statically bias their optimizations more towards either coverage or accuracy. Bit pattern prefetchers may have prohibitively high storage requirements (e.g., about 100 KB).

Furthermore, with the evolving DRAM landscape and technologies prefetching techniques need the ability to dynamically adapt to bandwidth, boosting predictions and coverage when headroom exists and throttling down to high accuracy when the bandwidth utilized is close to peak in certain embodiments. The embodiments herein allow for the scaling of their performance with higher DRAM bandwidth headroom.

In one embodiment, each of the specified requirements (low storage cost and dynamically optimizing for both coverage and accuracy while scaling with DRAM bandwidth) are squarely, effectively, and efficiently addressed by the embodiments of the dual spatial bit pattern prefetcher disclosed herein.

In one embodiment, a dual spatial (bit) pattern prefetcher is a lightweight spatial region prefetcher that uses bit operations like rotation, bitwise logical OR, and bitwise logical AND to dynamically improve both coverage and accuracy at low storage cost and scale its performance with DRAM bandwidth headroom.

In certain embodiments, a dual spatial pattern prefetcher (e.g., prefetch circuit) contributes the following innovations:

in one embodiment, a dual spatial pattern prefetcher (e.g., prefetch circuit) employs two modulated bit patterns to simultaneously optimize on coverage, accuracy and storage. Bit patterns are stored by rotating them to their triggering offset in a page. This effectively captures all possible deltas from the triggering offset, in one embodiment, bit patterns are stored compressed at higher (e.g., 128B) granularity rather than a lower (e.g., 64B) granularity to reduce storage and allow for the usage of two patterns simultaneously, in one embodiment, a coverage biased pattern adds bits/predictions through the use of simple bitwise OR operations, e.g., with a second accuracy biased pattern retaining recurring bits through simple bitwise AND operations, and in one embodiment, a method of tracking bandwidth and measuring coverage and accuracy allows for the dynamic selection of the best prediction candidate at run-time.

An important distinction of a dual spatial pattern prefetcher as disclosed herein is the scaling in performance with increasing memory bandwidth, which it is believed that no prior prefetcher has achieved.

A dual spatial pattern prefetcher as disclosed herein extracts more patterns from an address access stream (thus increasing prefetch coverage) and dynamically adapts to available memory bandwidth headroom in embodiments as follows.

In certain embodiments, a spatial bit pattern representation anchored around a trigger access effectively captures all deltas (local and global) from the trigger and exposes patterns that are otherwise obfuscated by reordering in the machine.

In one embodiment, prefetching is a speculation mechanism to predict future addresses to be accessed by the program. These address access patterns can be represented in various forms (e.g., full cacheline address, offsets in 2 KB/4 KB region, or deltas between successive offsets) and choosing an address access pattern that has the best chance of exposing repeating patterns can help boosting prefetch coverage and performance. Patterns in address accesses that are apparent when taking a global or accumulative view of accesses might not be visible when a restricted and low-level view of deltas between consecutive accesses is employed.

FIG. 1 illustrates a block diagram 100 of a multiple core hardware processor 102 with a prefetch circuit 120 according to embodiments of the disclosure. Any processor may include a prefetch circuit, e.g., the processors discussed below. FIG. 1 illustrates an embodiment of multiple processor cores (core A and core B) and multiple levels of caches (L1, L2, and L3), e.g., in a cache coherency hierarchy. Although two cores are depicted, a single or more than two cores may be utilized. Although multiple levels of cache are depicted, a single, or any number of caches may be utilized.

Cache(s) may be organized in any fashion, for example, as a physically or logically centralized or distributed cache.

In an embodiment, a processor, such as a processor or processors including the processor cores illustrated in the Figures, or any other processor, may include one or more caches. FIG. 1 illustrates an embodiment of a three level (e.g., levels 1 (L1), 1 (L2), and 3 (L3)) cache. A processor may include at least one core and at least one un-core. In one embodiment, multiple cores (core A and B) are of a single processor 102. A core (e.g., core A and core B) may include the components of a processor to execute instructions. An un-core may include all logic not in a core. A processor core (e.g., core A) may include components such as a level 1 instruction cache (L1I) 108 and a level 1 data cache (L1D) 110. A core (e.g., core A) may include components such as an address generation unit (AGU) 112, translation lookaside buffer (TLB) 114, and a level 1 cache (L2) 116. A core may or may not share a cache with other cores, e.g., core A and core B may share the level 3 cache (L3) 118 but not the L2 116 or L1 (208.210). A core may include any combination of these components or none of these components. Processor 102 (e.g., core A and core B) may access (e.g., load and store) data in the system memory 124, e.g., as indicated by the arrows. In one embodiment, the system memory 124 communicates with the core over a bus, e.g., at a slower access and/or cycle time than the core accessing cache (e.g. cache on the processor 102). System memory 124 may include a multidimensional array 126, e.g., loaded into the system memory 124 previously to the execution of a prefetch instruction.

An address generation unit (e.g., AGU 112), for example, address computation unit (ACU), may refer to an execution unit inside a processor (e.g., a core) that calculates addresses used to access memory (e.g., system memory 124), for example, to allow the core to access the system memory. In one embodiment, the AGU takes an address stream (e.g., equations) as an input and outputs the (e.g., virtual) addresses for that stream. An AGU (e.g., circuit) may perform arithmetic operations, such as addition, subtraction, modulo operations, or bit shifts, for example, utilizing an adder, multiplier, shifter, rotator, etc. thereof.

A translation lookaside buffer (e.g., TLB 114) may convert a virtual address to a physical address (e.g., of the system memory). A TLB may include a data table to store (e.g., recently used) virtual-to-physical memory address translations, e.g., such that the translation does not have to be performed on each virtual address present to obtain the physical memory address. If the virtual address entry is not in the TLB, a processor may perform a page walk to determine the virtual-to-physical memory address translation.

Prefetch circuit 120 may be a separate functional circuit (e.g., unit), for example, not utilizing the functional units (e.g., execution unit, Arithmetic Logic Unit (ALU), AGU, TLB, etc.) of a core. Prefetch circuit may be utilized by a prefetch instruction. Prefetch circuit may include circuitry (e.g., hardware logic circuitry) to perform the prefetching discussed herein. Prefetch circuit may be part of a processor (e.g., separate from a core(s)). Prefetch circuit may communicate with the core(s) of the processor, e.g., via communication resources, such as, but not limited to, a ring network. Processor 102 may communicate with the system memory 124 and/or caches (e.g., L1, L2, or L3 in FIG. 1) via a memory controller (e.g., as part of the processor) and/or an interconnect. Prefetch circuit 120 may output a system memory addresses of the multidimensional block of elements that is to-be-loaded (e.g., copied) into cache (e.g., L1, L2, or L3 in FIG. 1) from multidimensional array 126 in system memory 124. Prefetch circuit 120 may output the system memory addresses to the memory controller (e.g., memory unit 1270 in FIG. 12B) of processor 102.

FIG. 2 illustrates spatial bit patterns 206, anchored to a trigger access (depicted as being circled), that capture local and global deltas according to embodiments of the disclosure. FIG. 2 illustrates an example of multiple sets of accesses (e.g., each with a unique access signature) within a spatial region and their representation in various formats. The first access to the region is termed as the "trigger" access and marked with a black circle. For example, with first entry "02" in access stream A of streams 202 indicating an access of cache line 2 in page A, second entry "06" in access stream A indicating an access of cache line 6 in page A, etc. In FIG. 2, access sets for pages B through E have the same trigger offset in their spatial region and touch all the same offsets but in different temporal order. Such variations may be an artifact of reordering due to arbitration and scheduling in the cache/memory sub-systems. The longer the access sequence, the higher the probability of variations in certain embodiments. In certain embodiments, these accesses all have different representations when successive deltas 204 are used but can be represented by a single spatial bit pattern. For example, access set B and access set C with trigger offset 1 have two delta representations (+4,−1,+7,+1 and +4,+6,−7,+8, respectively) but a single bit pattern representation BP2 (0100 1100 0001 1000). Crucially, when bit patterns are rotated (e.g., left) and anchored to the "trigger" offset, all sets in the example coalesce into a single representation 208 (1001 1000 0011 0000). Such anchored bit patterns capture all deltas relative to a trigger access, including local (successive) and global (accumulated) in FIG. 2.

In certain embodiments, both coverage and accuracy can be simultaneously optimized by using bitwise logical OR and AND operations to modulate two spatial bit patterns, one biased towards coverage and the other towards the accuracy.

Multiple access streams in a program can have anchored bit patterns that are similar (e.g., have some intersection in bits set) but not exactly the same. A dual spatial pattern prefetcher (e.g., prefetch circuit) as disclosed herein uses a novel and intuitive approach of using two modulated bit patterns, e.g., one biased towards coverage and the other towards accuracy. Coverage increases by adding bits to the predicted pattern, which can be achieved using a bitwise logical OR operation on two bit patterns. For example, only retaining bits that occur in the pattern tracks accuracy, and this is achieved via a bitwise logical AND operation on the two patterns.

FIG. 3 illustrates modulated bit patterns 302 according to embodiments of the disclosure. FIG. 3 shows an example of how multiple different address streams that map to three rotated bit patterns 314, 316, 318 can be modulated into a coverage-biased pattern 320 (e.g., bit vector) and an accuracy-biased pattern 322 (e.g., bit vector). For example, with first delta sequence set 306 for a first set of accesses, second delta sequence set 308 for a second set of accesses, and third delta sequence set 310 for a third set of accesses. A set of accesses may be grouped based on the program counter (PC) (e.g., instruction pointer) that caused that respective access, for example, the PC for the instruction that caused a respective access. In one embodiment, each set of accesses has a same (e.g., bottom or top) proper subset of bits of the PC, e.g., a same eight bits.

In FIG. 3, first rotated and anchored spatial bit pattern 314 is formed from first delta sequence set 306 for a first set of accesses, second rotated and anchored spatial bit pattern 316 is formed from second delta sequence set 308 for a second set of accesses, and third rotated and anchored spatial bit pattern 318 is formed from third delta sequence set 310 for a third set of accesses, e.g., formed as discussed in reference to FIG. 2.

In FIG. 3, modulated bit pattern for convergence 320 (CovP) is generated by performing a (bitwise) logical OR operation 324 on first rotated and anchored spatial bit pattern 314, second rotated and anchored spatial bit pattern 316, and third rotated and anchored spatial bit pattern 318. In FIG. 3, modulated bit pattern for accuracy 322 (AccP) is generated by performing a (bitwise) logical AND operation 324 on first rotated and anchored spatial bit pattern 314, second rotated and anchored spatial bit pattern 316, and third rotated and anchored spatial bit pattern 318.

In certain embodiments, a dynamic modulation of these bit patterns enables a simultaneous optimization for both coverage and accuracy, despite these metrics being at odds with each other. The available memory bandwidth headroom, coupled with a quantified measure of accuracy and coverage, can be used to select between the two different bit pattern candidates (e.g., coverage biased or accuracy biased) dynamically at run-time.

In certain embodiments, {+1} and {−1} are two most frequently occurring offset deltas in programs. For example, in certain programs, those two deltas appear more than 50% of the time on average. Therefore, instead of storing bit patterns with each bit representing a (e.g., 64B) cacheline granularity, a dual spatial pattern prefetcher (e.g., prefetch circuit) as disclosed herein may store a compressed bit pattern where each bit represents two adjacent (e.g., 64B) cachelines (e.g., 128B granularity). This directly halves the pattern storage requirement. While this could theoretically have up-to a 50% inaccuracy in predictions, a dual spatial pattern prefetcher (e.g., prefetch circuit) as disclosed herein may have less than one misprediction every five cachelines prediction (e.g., a 20% inaccuracy).

In certain embodiments, multiple prefetch triggers on a physical page increases prefetch coverage. Certain embodiments of a dual spatial pattern prefetcher (e.g., prefetch circuit) incorporates measures to track accuracy and throttle predictions, and thus can dynamically make predictions at both full physical page (e.g., 4 KB) and half physical page (e.g., 2 KB) granularities. Instead of using a larger (e.g., 64 b) bit pattern for coverage-biased (CovP) and accuracy-biased (AccP) patterns, certain embodiments herein split each of them into two smaller (e.g., 32 b) patterns.

In one embodiment, two (e.g., small 2-bit) counters, named as $Measure_{CovP}$ and $Measure_{AccP}$, track coverage and accuracy of each (e.g., 32 b) bit pattern, e.g., having both of these counters for each bit pattern. The prediction selection may also be made per 2 KB (e.g., 32 b) segment of a 4 KB page.

A dual spatial pattern prefetcher (e.g., prefetch circuit) as disclosed herein may include the following structures:
a multiple (e.g., 64) entry first-in, first-out (FIFO) structure called a page buffer (PB) that tracks the most recently accessed (e.g., 4 KB) pages in a cache (e.g., the L2 cache). In one embodiment, each PB entry is indexed by a (e.g., 4 KB) physical page and stores a (e.g., 64 b) bit pattern (uncompressed and raw access pattern) that accumulates the cache (e.g., L2) accesses seen by the program loads and stores to the page. It may also store an (e.g., 8 b) hashed program counter (PC) (e.g., instruction pointer) and two (e.g., 6 b) triggering offsets, one for each (e.g., 2 KB) segment of a physical page, to generate signature and anchor access bit pattern;
a multiple (e.g., 256) entry signature pattern table (SPT) that stores the correlation between a signature and the follower bit pattern. In certain embodiments, SPT is a direct mapped structure, indexed by signature.

In one embodiment, each SPT entry stores the following elements:
CovP (e.g., 32 b): coverage-biased compressed bit pattern,
AccP (e.g., 32 b): accuracy-biased compressed bit pattern,
$2 \times Measure_{CovP}$ (e.g., 2×2 b): saturating counters each tracking coverage feedback for 2 KB region within a physical page,
$2 \times Measure_{AccP}$ (e.g., 2×2 b): saturating counters each tracking accuracy feedback for 2 KB region within a physical page, and
$2 \times OR_{count}$ (e.g., 2×2 b): saturating counters to keep track of number of OR operations on two segments of CovP; and
Prefetch Buffer (e.g., 16 entry—that holds 2 (e.g., 64 b) bit vectors for generated and issued prefetches.

Figure 4A:
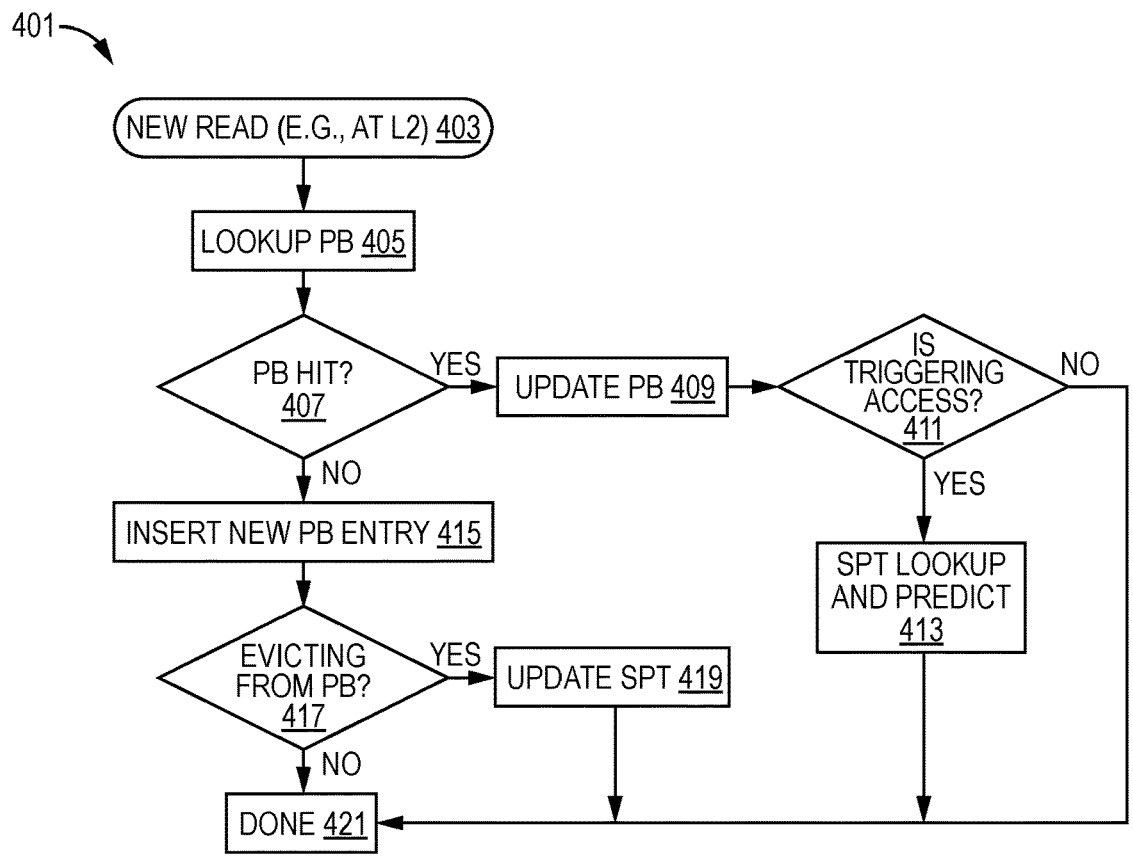
FIG. 4A illustrates a flow diagram for a dual spatial pattern prefetcher according to embodiments of the disclosure.
Figure 4B:
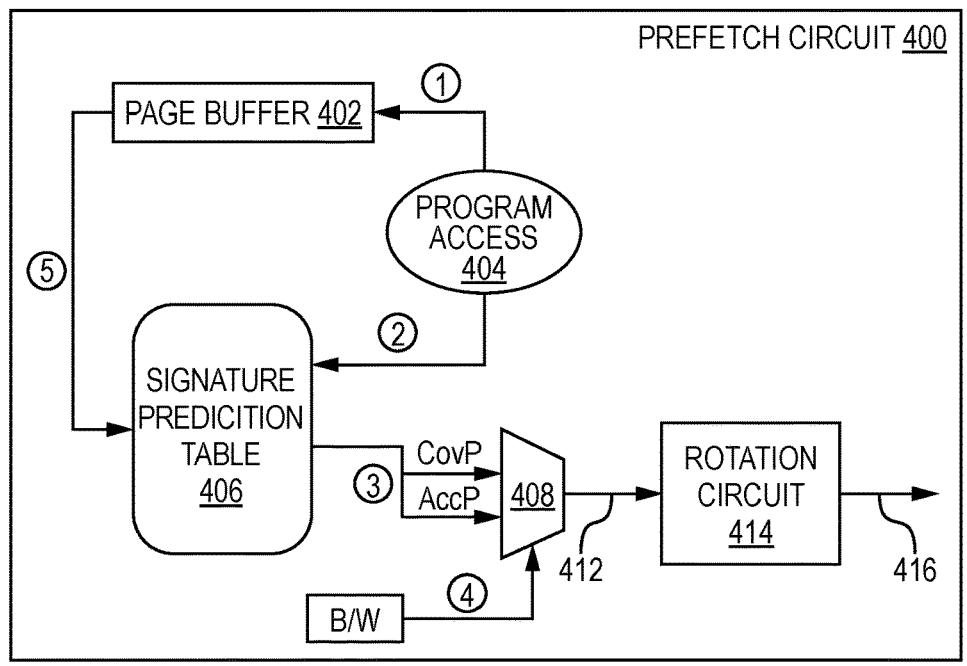
FIG. 4B illustrates a dual spatial pattern prefetch circuit according to embodiments of the disclosure.

FIG. 4A illustrates a flow diagram 401 for a dual spatial pattern prefetcher according to embodiments of the disclosure. FIG. 4B illustrates a dual spatial pattern prefetch circuit 400 according to embodiments of the disclosure. In certain embodiments, a prefetch circuit 400 as in FIG. 4B is included to prefetch data, for example, to predict access addresses and bring the data for those addresses into a cache or caches (e.g., from memory). In one embodiment, prefetch circuit 400 in FIG. 4B is an instance of the prefetch circuit 120 in FIG. 1. In one embodiment, prefetch circuit 400 in FIG. 4B is an instance of the prefetch circuit 1278 in FIG. 12B.

In the following example, every demand access 403 (e.g., an L2 cache demand access for a miss in an L1 cache) (e.g., program access 404) looks up 405 page buffer 402 (PB) by the physical page number (step 1). If a corresponding entry is found, dual spatial pattern prefetcher (e.g., prefetch circuit) sets 409 the appropriate bit position in access bit pattern in PB entry. As checked at 411, the first access to each (e.g., 2 KB) segment in the (e.g., 4 KB) page is eligible to trigger prefetches (step 2). If not a triggering access, the flow advances to done 421. If a triggering access, the access signature (e.g., program counter (PC)) of this trigger access is stored in the PB entry and used to index into the SPT 406 which returns the CovP and AccP predictions and the measure of their goodness ($Measure_{CovP}$ and $Measure_{AccP}$ counters) at 413 (step 3). Selection flow (e.g., detailed in FIG. 5) uses the system bandwidth 410 and measure to select (e.g., via multiplexer 408) a prediction pattern 412 for prefetch (step 4). In certain embodiments, this prediction pattern 412 is rotated by rotation circuit 414 to align to the trigger access offset to generate a rotated prediction pattern 416 before issuing prefetches. On eviction from the PB (step 5) as checked at 417, for each trigger (e.g., per 2 KB segment), the stored bit pattern is rotated to anchor to trigger offset, hashed into the SPT using the stored trigger access signature (e.g., PC), and the patterns and counters are updated at 419. If no PB hit at 407, a new PB entry is inserted at 415 into page buffer 402.

In one embodiment, each entry (e.g., row in a table-row matrix) includes (i) a physical page ID number (e.g., used for identification of the page when looking up the page buffer), (ii) a spatial bit pattern (for example, a bit vector that represents the spatial access stream information, e.g., illustrating the cache lines that have been accessed as a 1 and a 0 otherwise) to the page (e.g., this is the pattern that will be rotated and used to update the SPT CovP and AccP patterns), (iii) the program counter (PC) of the triggering (e.g., first) access to the segment (e.g., used to index into the SPT), and/or (iv) the cache line offset of the triggering (e.g., first) access to a segment. Table 1 illustrates an example of two entries in a page buffer with example values and the trigger accesses shown as underlined.

TABLE 1

Example Page Buffer Format.

| Page | Trigger PC | Spatial Bit Pattern |
|---|---|---|
| 0 × 65 | 0x7FFECCA | 0010 1100 0001 0010 |
| 0 × 66 | 0x7FF8980 | 0001 0010 0011 0001 |

TABLE 2 illustrates an example of a single entry
in a signature prediction table (SPT)

| PC Signature | CovP Pattern | AccP Pattern |
|---|---|---|
| 0x7FFECCA (or 0xCA if using the bottom 8 bits) | 1011 0011 1110 0011 | 0001 0000 0011 0010 |

An example of operations in reference to Tables 1 and 2 is to detect a new access to page 0x65, this new access is from an instruction having a PC of 0x7FFECCA, it is to the 4th (e.g., indexed from 0-N, where N is a positive integer greater than 1) cache line in the page and this is a triggering access (e.g., first access to this segment of the page) (e.g., as detected from accessing Table 1), next, a look-up is performed in the SPT (e.g., in Table 2) using the (e.g., lower proper subset of) bits of the PC 0x7FF3CCA (for example, if using the bottom 8 bits, lookup entry 0xCA of the SPT), the SPT lookup yields both CovP and AccP pattern. For example, picking one of them to use based on the system bandwidth. In certain embodiments, the picked CovP or AccP pattern is now rotated to the right by the cache line offset of the triggering access (e.g., which is 4 in the example from Table 1 as shown by the underlined 1). In certain embodiments of FIG. 4B, the prefetch circuit 400 outputs the rotated prediction pattern 416.

In certain embodiments, the positions of ones in this rotated prediction pattern are the prefetches to be issued for the cache lines (e.g., with no prefetches issued for the cache lines corresponding to the zeros).

Next, the SPT may be updated.

SPT Update Phase:

In certain embodiments, each SPT update has three bit patterns of information: (1) actual program access (e.g., spatial access) bit pattern (e.g., that is coming from victim PB entry), (2) CovP stored inside SPT entry, and (3) AccP that are stored inside that SPT entry.

Certain embodiments of a dual spatial pattern prefetcher (e.g., prefetch circuit) measures coverage and accuracy metric of CovP and AccP individually by two ratios of PopCount (counting number of bits set in a bit pattern) as shown in Table 3 below.

TABLE 3

Example measure of program coverage and prediction
accuracy through simple bit operations.

| | Pattern | | | PopCount | |
|---|---|---|---|---|---|
| Program | 1011 0100 0011 1100 | | | 8 | |
| Predicted | 1010 0110 0000 0001 | | | 5 | |
| Bitwise-AND | 1010 0100 0000 0000 | | | 3 | |
| | <25% | 25-50% | 50-75% | >=75% | |
| Prediction Accuracy | 3/5 | | ✓ | | |
| Program Coverage | 3/8 | ✓ | | | |

Figure 5:
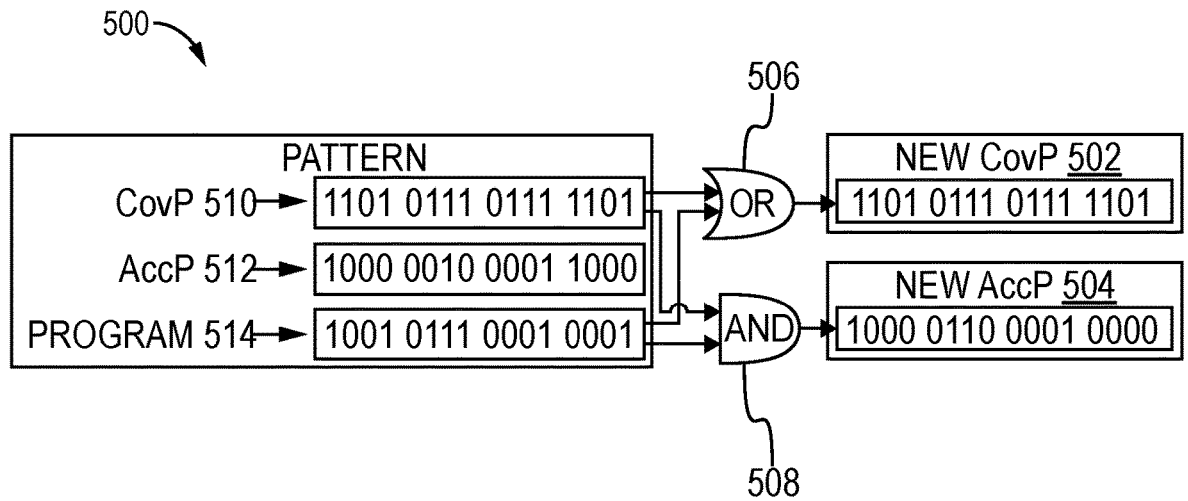
FIG. 5 illustrates circuitry to update a coverage-biased modulated bit pattern (CovP) and an accuracy-biased modulated bit pattern (AccP) according to embodiments of the disclosure.

FIG. 5 illustrates circuitry to update a coverage-biased modulated bit pattern (CovP) 502 and an accuracy-biased modulated bit pattern (AccP) 504 according to embodiments of the disclosure. Certain embodiments of a dual spatial pattern prefetcher (e.g., prefetch circuit) modulate the stored CovP and AccP bit patterns based on the calculated ratios the following way:

CovP modulation: CovP adds bit by a bitwise logical OR operation 506 on the stored CovP pattern (CovP pattern 510 in FIG. 5) with the actual program (PROGRAM pattern 514 in FIG. 5) access pattern. However, since an unchecked number of OR operations may eventually set all bits in a pattern, certain embodiments limit it to a certain number of (e.g., three) OR operations (e.g., tracked with a 2 b saturating counter $Or_{Count}$). $Or_{Count}$ is incremented every time the OR operation adds any bits to the predicted pattern. To quantify the goodness of CovP, certain embodiments of a dual spatial pattern prefetcher (e.g., prefetch circuit) employ a (e.g., 2 b) saturating counter $Measure_{CovP}$ that is incremented whenever the CovP prediction accuracy is less than a threshold $Acc_{Thr}$ or the program coverage from CovP is less than a threshold $Cov_{Thr}$. This allows to reset CovP to the incoming program pattern when $Measure_{CovP}$ is saturated and either the current bandwidth utilization is above a first threshold (e.g., 75%) (e.g., highest quartile) or the coverage is still less than a lower threshold (e.g., 50%) (e.g., despite up-to three OR operations). Certain embodiments use the 50% quartile threshold for both $ACC_{Thr}$ and $Cov_{Thr}$. Thus certain embodiments update two modulated spatial bit patterns to simultaneously optimize for coverage and accuracy.

AccP modulation: in embodiment, the accuracy-biased bit pattern requires retaining recurring bits in the bit pattern, which can be achieved by a bit-wise logical AND operation 508. Rather than recursive AND operations on AccP, on every update, AccP is replaced by a bit-wise AND operation of the incoming program access bit pattern (PROGRAM pattern 514 in FIG. 5) and the CovP (the coverage-biased pattern) (CovP pattern 510 in FIG. 5) in certain embodiments. This effectively retains only bits that have consecutive recurrence counts in the bit pattern. Similar to the $Measure_{CovP}$, certain embodiments herein use a (e.g., 2 b) saturating counter $Measure_{AccP}$ to track the goodness of AccP. $Measure_{AccP}$ is incremented if AndP prediction accuracy is less than a threshold (e.g., 50%) and decrements otherwise. $Measure_{AccP}$ is used to completely throttle down predictions when bandwidth utilization is high and inaccuracy is high in one embodiment.

Figure 6:
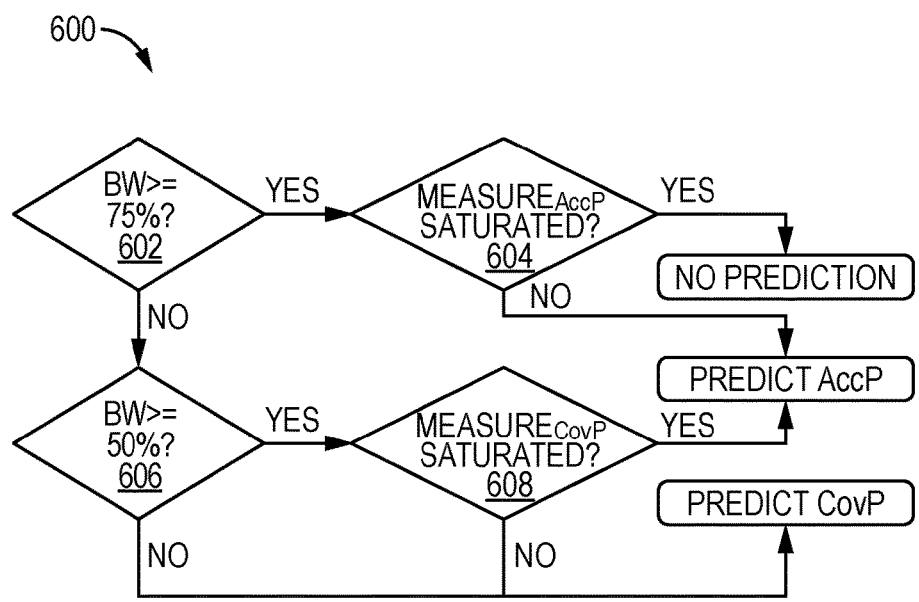
FIG. 6 illustrates a flow diagram to select between a coverage-biased modulated bit pattern (CovP) and an accuracy-biased modulated bit pattern (AccP) according to embodiments of the disclosure.

FIG. 6 illustrates a flow diagram to select between a coverage-biased modulated bit pattern (CovP) and an accuracy-biased modulated bit pattern (AccP) according to embodiments of the disclosure. FIG. 6 shows an example flow used between CovP and AccP for prediction. When at 602 bandwidth utilization is in the highest quartile (75%), certain embodiments of a dual spatial pattern prefetcher (e.g., prefetch circuit) select AccP at 604 if Measure$_{AccP}$ is not saturated. When bandwidth utilization is in the second highest quartile (between 50% and 75%) at 606, certain embodiments of a dual spatial pattern prefetcher (e.g., prefetch circuit) select AccP at 608 if Measure$_{CovP}$ is saturated (e.g., meaning CovP is too inaccurate for a desired use here) and CovP otherwise. When bandwidth utilization is less than 50%, certain embodiments of a dual spatial pattern prefetcher (e.g., prefetch circuit) simply use CovP. These numbers are examples and other thresholds may be utilized. To minimize any pollution effects in this mode, if Measure$_{CovP}$ is saturated (meaning CovP is inaccurate), certain embodiments of a dual spatial pattern prefetcher (e.g., prefetch circuit) fill these prefetches vulnerably (e.g., zero age) in the on-die (e.g., L2 and/or L3) caches.

Figure 7:
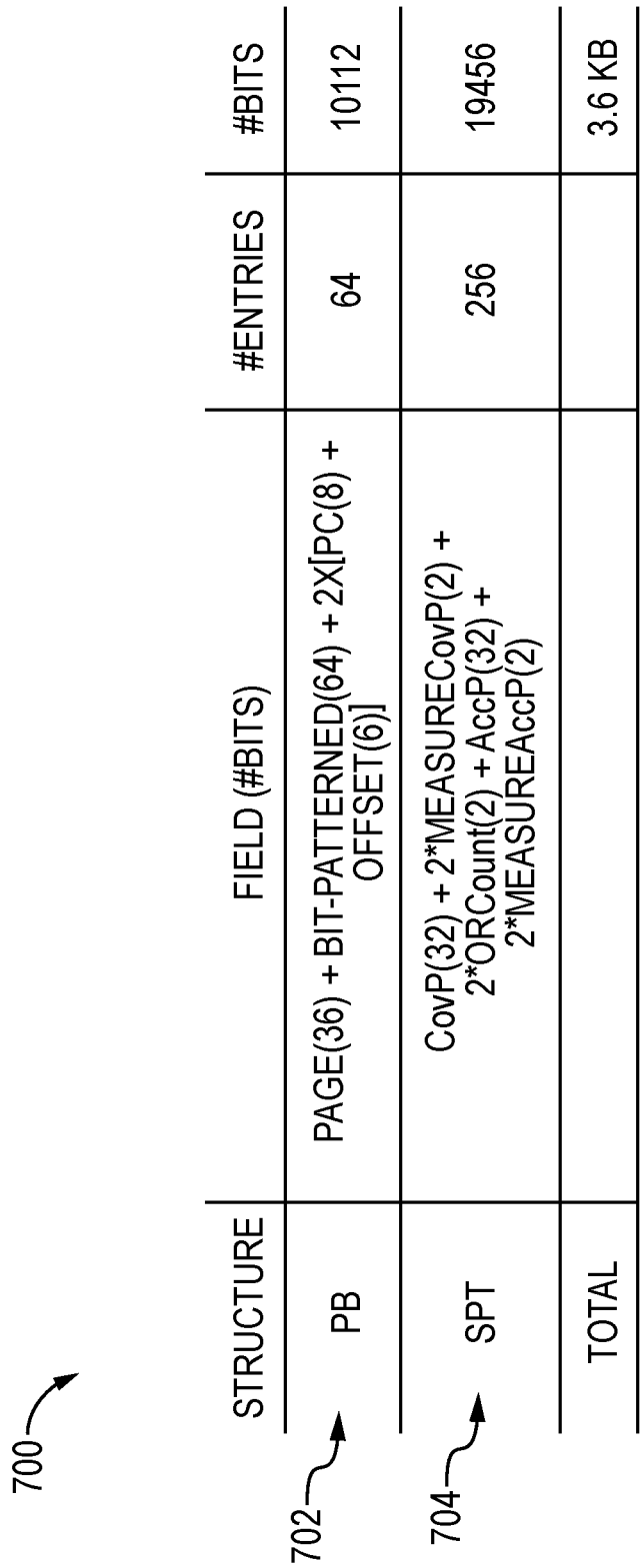
FIG. 7 illustrates an example size table of storage for a dual spatial pattern prefetcher according to embodiments of the disclosure.

FIG. 7 illustrates an example size table 700 of storage for a dual spatial pattern prefetcher according to embodiments of the disclosure. Table 700 includes an entry for an example page buffer 702 (PB) and an example signature prediction table 704 (SPT).

Figure 8:
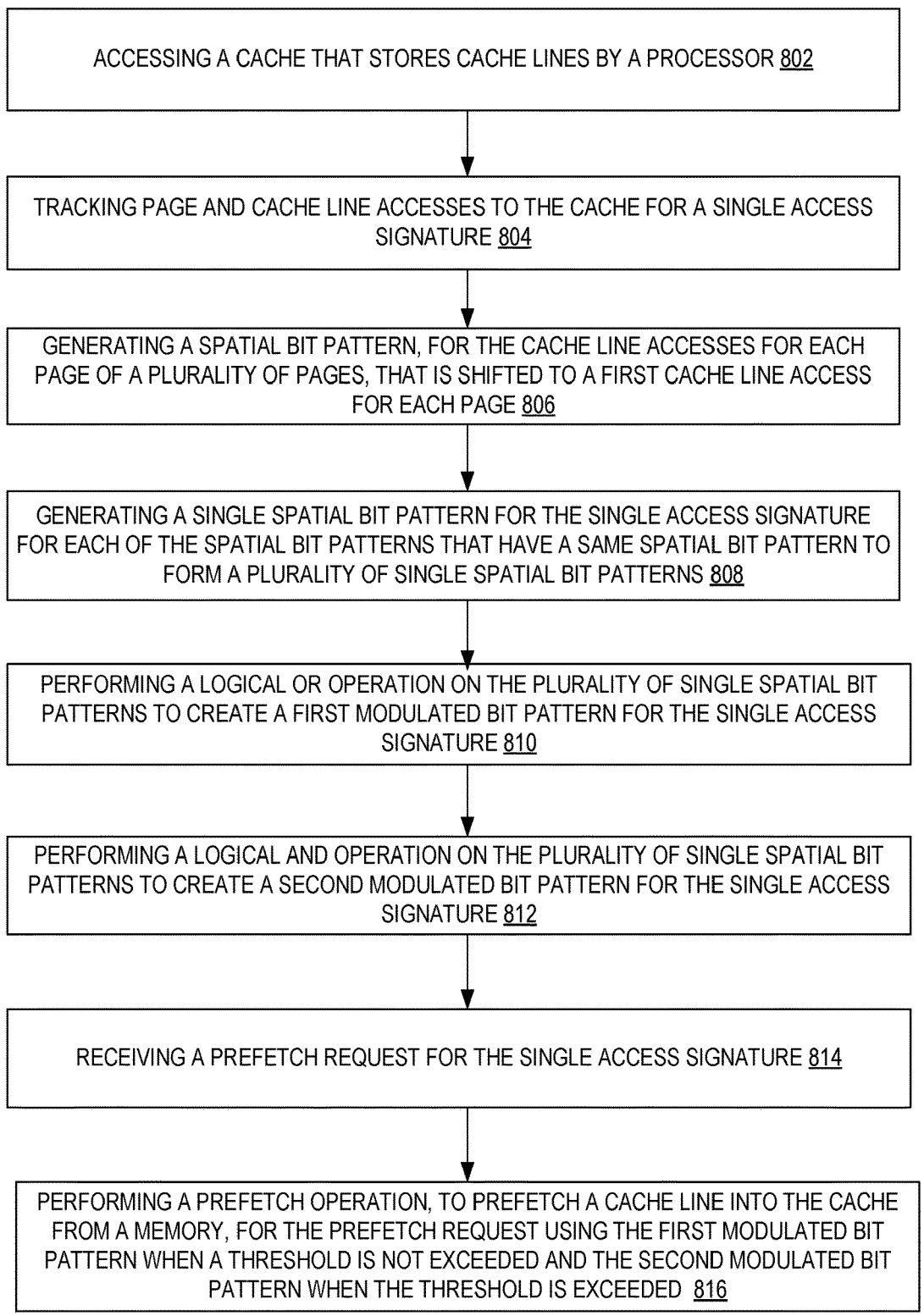
FIG. 8 is a flow diagram according to embodiments of the disclosure.

FIG. 8 is a flow diagram 800 according to embodiments of the disclosure. Depicted flow 800 includes accessing a cache that stores cache lines by a processor 802; tracking page and cache line accesses to the cache for a single access signature 804; generating a spatial bit pattern, for the cache line accesses for each page of a plurality of pages, that is shifted to a first cache line access for each page 806; generating a single spatial bit pattern for the single access signature for each of the spatial bit patterns that have a same spatial bit pattern to form a plurality of single spatial bit patterns 808; performing a logical OR operation on the plurality of single spatial bit patterns to create a first modulated bit pattern for the single access signature 810; performing a logical AND operation on the plurality of single spatial bit patterns to create a second modulated bit pattern for the single access signature 812; receiving a prefetch request for the single access signature 814; and performing a prefetch operation, to prefetch a cache line into the cache from a memory, for the prefetch request using the first modulated bit pattern when a threshold is not exceeded and the second modulated bit pattern when the threshold is exceeded 816.

Thus, the embodiments of a dual spatial pattern prefetcher (e.g., prefetch circuit) disclosed herein have the ability to scale performance with increasing memory bandwidth by boosting coverage and throttling down to high accuracy when the bandwidth utilized is close to peak to achieve a significant increase in processor performance over another prefetcher. For example, by providing a dual spatial pattern prefetcher (e.g., prefetch circuit) that scales in performance to make the most use of ever increasing memory bandwidth (e.g., and the inability of other prefetchers to do so), simultaneously optimizes coverage and accuracy modulating two bit patterns through bit-wise operations AND and OR, and uses a novel but efficiently implemented method of tracking bandwidth and measuring the coverage and accuracy of predicted patterns, allowing for dynamic selection of the best prediction candidate at run-time.

Exemplary architectures, systems, etc. that the above may be used in are detailed below.

At least some embodiments of the disclosed technologies can be described in view of the following examples:

Example 1. An apparatus comprising:
a processor core to access a memory and a cache that stores cache lines; and
a prefetch circuit to prefetch a cache line into the cache from the memory, wherein the prefetch circuit is to:
track page and cache line accesses to the cache for a single access signature,
generate a spatial bit pattern, for the cache line accesses for each page of a plurality of pages, that is shifted to a first cache line access for each page,
generate a single spatial bit pattern for the single access signature for each of the spatial bit patterns that have a same spatial bit pattern to form a plurality of single spatial bit patterns,
perform a logical OR operation on the plurality of single spatial bit patterns to create a first modulated bit pattern for the single access signature,
perform a logical AND operation on the plurality of single spatial bit patterns to create a second modulated bit pattern for the single access signature,
receive a prefetch request for the single access signature, and
perform a prefetch operation for the prefetch request using the first modulated bit pattern when a threshold is not exceeded and the second modulated bit pattern when the threshold is exceeded.

2. The apparatus of example 1, wherein the single access signature is a single instruction pointer value.

3. The apparatus of example 1, wherein the prefetch request comprises a miss of data in the cache (e.g., wherein the cache having the miss is a first level cache).

4. The apparatus of example 1, wherein the threshold is a bandwidth utilization threshold of the memory.

5. The apparatus of example 1, wherein the prefetch circuit is further to update the first modulated bit pattern with results of a logical OR operation on the first modulated bit pattern and an actual program access bit pattern for the single access signature.

6. The apparatus of example 5, wherein the actual program access bit pattern is for a victim page buffer entry.

7. The apparatus of example 5, wherein the prefetch circuit is further to update the second modulated bit pattern with results of a logical AND operation on the first modulated bit pattern and the actual program access bit pattern for the single access signature.

8. The apparatus of example 1, wherein the prefetch circuit is further to update the second modulated bit pattern with results of a logical AND operation on the first modulated bit pattern and an actual program access bit pattern for the single access signature.

Example 9. A method comprising:
accessing a cache that stores cache lines by a processor;
tracking page and cache line accesses to the cache for a single access signature;
generating a spatial bit pattern, for the cache line accesses for each page of a plurality of pages, that is shifted to a first cache line access for each page;
generating a single spatial bit pattern for the single access signature for each of the spatial bit patterns that have a same spatial bit pattern to form a plurality of single spatial bit patterns;
performing a logical OR operation on the plurality of single spatial bit patterns to create a first modulated bit pattern for the single access signature;

performing a logical AND operation on the plurality of single spatial bit patterns to create a second modulated bit pattern for the single access signature;

receiving a prefetch request for the single access signature; and performing a prefetch operation, to prefetch a cache line into the cache from a memory, for the prefetch request using the first modulated bit pattern when a threshold is not exceeded and the second modulated bit pattern when the threshold is exceeded.

10. The method of example 9, wherein the single access signature is a single instruction pointer value.

11. The method of example 9, wherein the prefetch request comprises a miss of data in the cache.

12. The method of example 9, further comprising setting the threshold as a bandwidth utilization threshold of the memory.

13. The method of example 9, further comprising updating the first modulated bit pattern with results of a logical OR operation on the first modulated bit pattern and an actual program access bit pattern for the single access signature.

14. The method of example 13, wherein the actual program access bit pattern is for a victim page buffer entry.

15. The method of example 13, further comprising updating the second modulated bit pattern with results of a logical AND operation on the first modulated bit pattern and the actual program access bit pattern for the single access signature.

16. The method of example 9, further comprising updating the second modulated bit pattern with results of a logical AND operation on the first modulated bit pattern and an actual program access bit pattern for the single access signature.

Example 17. A non-transitory machine readable medium that stores program code that when executed by a machine causes the machine to perform a method comprising:

accessing a cache that stores cache lines by a processor;

tracking page and cache line accesses to the cache for a single access signature;

generating a spatial bit pattern, for the cache line accesses for each page of a plurality of pages, that is shifted to a first cache line access for each page;

generating a single spatial bit pattern for the single access signature for each of the spatial bit patterns that have a same spatial bit pattern to form a plurality of single spatial bit patterns;

performing a logical OR operation on the plurality of single spatial bit patterns to create a first modulated bit pattern for the single access signature;

performing a logical AND operation on the plurality of single spatial bit patterns to create a second modulated bit pattern for the single access signature;

receiving a prefetch request for the single access signature; and performing a prefetch operation, to prefetch a cache line into the cache from a memory, for the prefetch request using the first modulated bit pattern when a threshold is not exceeded and the second modulated bit pattern when the threshold is exceeded.

18. The non-transitory machine readable medium of example 17, wherein the single access signature is a single instruction pointer value.

19. The non-transitory machine readable medium of example 17, wherein the prefetch request comprises a miss of data in the cache.

20. The non-transitory machine readable medium of example 17, further comprising setting the threshold as a bandwidth utilization threshold of the memory.

21. The non-transitory machine readable medium of example 17, further comprising updating the first modulated bit pattern with results of a logical OR operation on the first modulated bit pattern and an actual program access bit pattern for the single access signature.

22. The non-transitory machine readable medium of example 21, wherein the actual program access bit pattern is for a victim page buffer entry.

23. The non-transitory machine readable medium of example 21, further comprising updating the second modulated bit pattern with results of a logical AND operation on the first modulated bit pattern and the actual program access bit pattern for the single access signature.

24. The non-transitory machine readable medium of example 17, further comprising updating the second modulated bit pattern with results of a logical AND operation on the first modulated bit pattern and an actual program access bit pattern for the single access signature.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 9A:
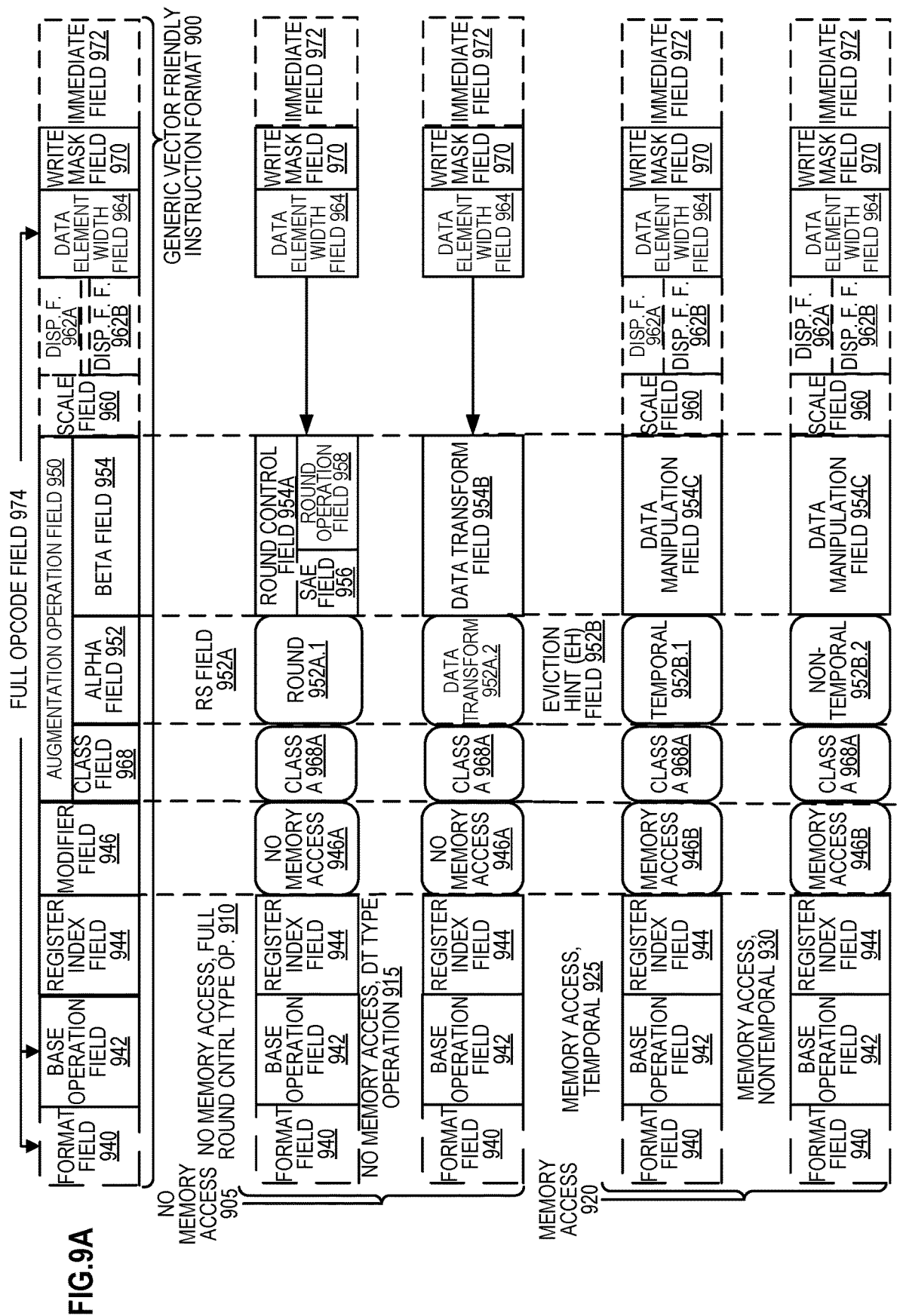
FIG. 9A is a block diagram illustrating a generic vector friendly instruction format and class A instruction templates thereof according to embodiments of the disclosure.
Figure 9B:
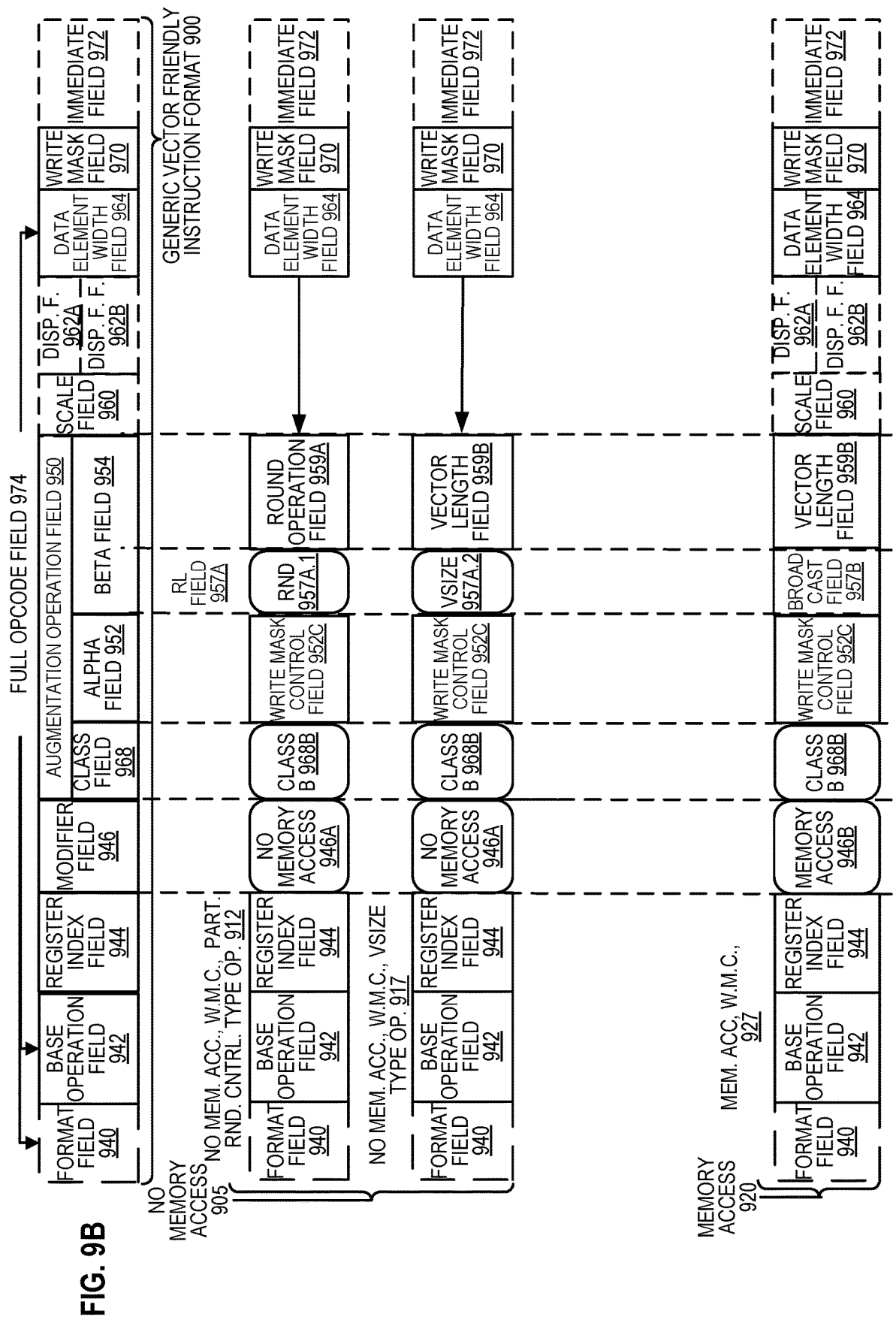
FIG. 9B is a block diagram illustrating the generic vector friendly instruction format and class B instruction templates thereof according to embodiments of the disclosure.

FIGS. 9A-9B are block diagrams illustrating a generic vector friendly instruction format and instruction templates thereof according to embodiments of the disclosure. FIG. 9A is a block diagram illustrating a generic vector friendly instruction format and class A instruction templates thereof according to embodiments of the disclosure; while FIG. 9B is a block diagram illustrating the generic vector friendly instruction format and class B instruction templates thereof according to embodiments of the disclosure. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In one embodiment of the disclosure, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}*\text{index}+\text{base}$).

Displacement Field 962A—its content is used as part of memory address generation (e.g., for address generation that uses $2^{scale}*\text{index}+\text{base}+\text{displacement}$).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the disclosure are described in which the write mask field's 970 content selects one of a number of write mask registers that contains the write mask to be used (and thus the write mask field's 970 content indirectly identifies that masking to be performed), alternative embodiments instead or additional allow the mask write field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described embodiments of the disclosure the round control field 954A includes a suppress all floating point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one embodiment of the disclosure where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st -level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one embodiment of the disclosure where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10 is a block diagram illustrating an exemplary specific vector friendly instruction format according to embodiments of the disclosure. FIG. 10 shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10 map are illustrated.

It should be understood that, although embodiments of the disclosure are described with reference to the specific vector friendly instruction format 1000 in the context of the generic vector friendly instruction format 900 for illustrative purposes, the disclosure is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the disclosure is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1005 (EVEX Byte 1, bits [7-5])—consists of a EVEX.R bit field (EVEX Byte 1, bit [7]—R), EVEX.X bit field (EVEX byte 1, bit [6]—X), and 957BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]—mmmm)—its content encodes an implied leading opcode byte (0F, 0F 38, or 0F 3).

Data element width field 964 (EVEX byte 2, bit [7]—W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]—U)—If EVEX.U=0, it indicates class A or EVEX.U0; if EVEX.U=1, it indicates class B or EVEX.U1.

Prefix encoding field 1025 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 954 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

FIG. 10B is a block diagram illustrating the fields of the specific vector friendly instruction format 1000 that make up the full opcode field 974 according to one embodiment of the disclosure. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to one embodiment of the disclosure. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
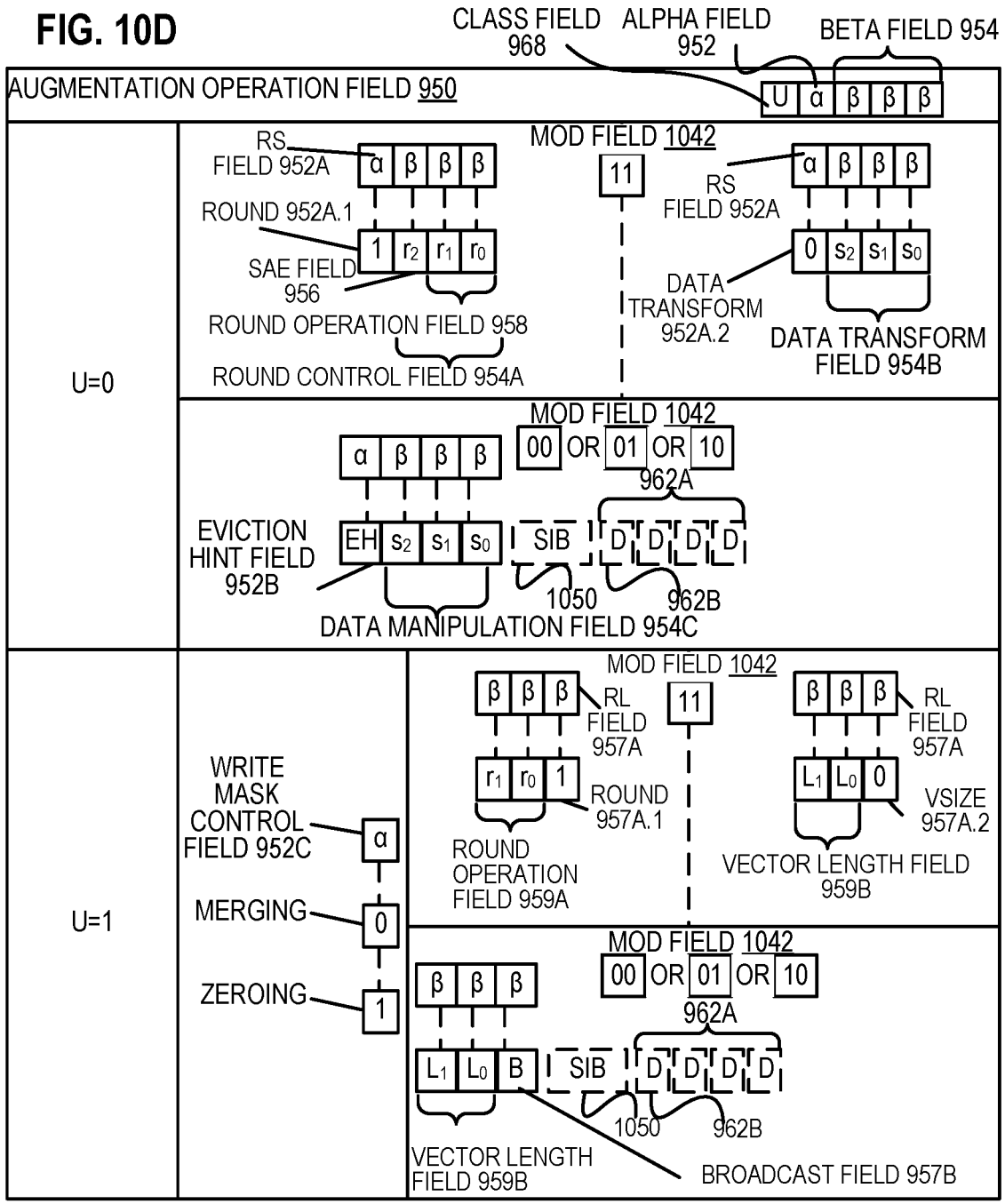
FIG. 10D is a block diagram illustrating the fields of the specific vector friendly instruction format in FIG. 10A that make up the augmentation operation field 950 according to one embodiment of the disclosure.

FIG. 10D is a block diagram illustrating the fields of the specific vector friendly instruction format 1000 that make up the augmentation operation field 950 according to one embodiment of the disclosure. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]—EH) is interpreted as the rs field 952A. When the rs field 952A contains a 1 (round 952A.1), the beta field 954 (EVEX byte 3, bits [6:4]—SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]—SSS) is interpreted as a three bit data transform field 954B. When U=0 and the MOD field 1042 contains 00, 01, or 10 (signifying a memory access operation), the alpha field 952 (EVEX byte 3, bit [7]—EH) is interpreted as the eviction hint (EH) field 952B and the beta field 954 (EVEX byte 3, bits [6:4]—SSS) is interpreted as a three bit data manipulation field 954C.

When U=1, the alpha field 952 (EVEX byte 3, bit [7]—EH) is interpreted as the write mask control (Z) field 952C. When U=1 and the MOD field 1042 contains 11 (signifying a no memory access operation), part of the beta field 954 (EVEX byte 3, bit [4]—$S_0$) is interpreted as the RL field 957A; when it contains a 1 (round 957A.1) the rest of the beta field 954 (EVEX byte 3, bit [6-5]—$S_{2-1}$) is interpreted as the round operation field 959A, while when the RL field 957A contains a 0 (VSIZE 957.A2) the rest of the beta field 954 (EVEX byte 3, bit [6-5]—$S_{2-1}$) is interpreted as the vector length field 959B (EVEX byte 3, bit [6-5]—$L_{1-0}$). When U=1 and the MOD field 1042 contains 00, 01, or 10 (signifying a memory access operation), the beta field 954 (EVEX byte 3, bits [6:4]—SSS) is interpreted as the vector length field 959B (EVEX byte 3, bit [6-5]—$L_{1-0}$) and the broadcast field 957B (EVEX byte 3, bit [4]—B).

Exemplary Register Architecture

Figure 11:
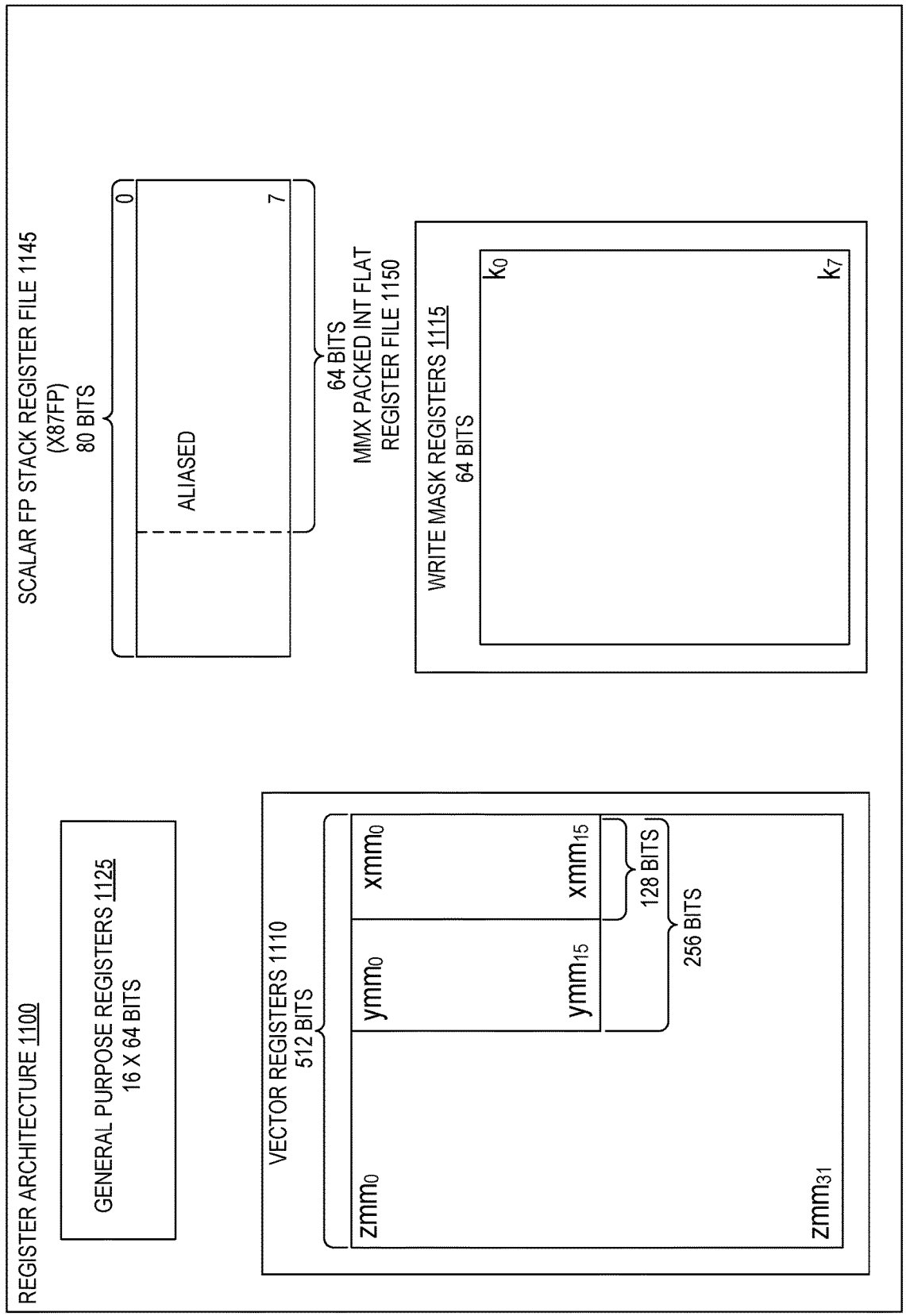
FIG. 11 is a block diagram of a register architecture according to one embodiment of the disclosure

FIG. 11 is a block diagram of a register architecture 1100 according to one embodiment of the disclosure. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

| Adjustable Vector Length | Class | Operations | Registers |
| --- | --- | --- | --- |
| Instruction Templates that do not include the vector length field 959B | A (FIG. 9A; U = 0) | 910, 915, 925, 930 | zmm registers (the vector length is 64 byte) |
| | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instructions templates without the vector length field 959B operate on the maximum vector length. Further, in one embodiment, the class B instruction templates of the specific vector friendly instruction format 1000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 12A is a block diagram illustrating both an exemplary in-order pipeline and an exemplary register renaming, out-of-order issue/execution pipeline according to embodiments of the disclosure. FIG. 12B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macro-instructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

In certain embodiments, a prefetch circuit 1278 is included to prefetch data, for example, to predict access addresses and bring the data for those addresses into a cache or caches (e.g., from memory 1280). In one embodiment, prefetch circuit 1278 is an instance of the prefetch circuit in FIG. 3B.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 13B:
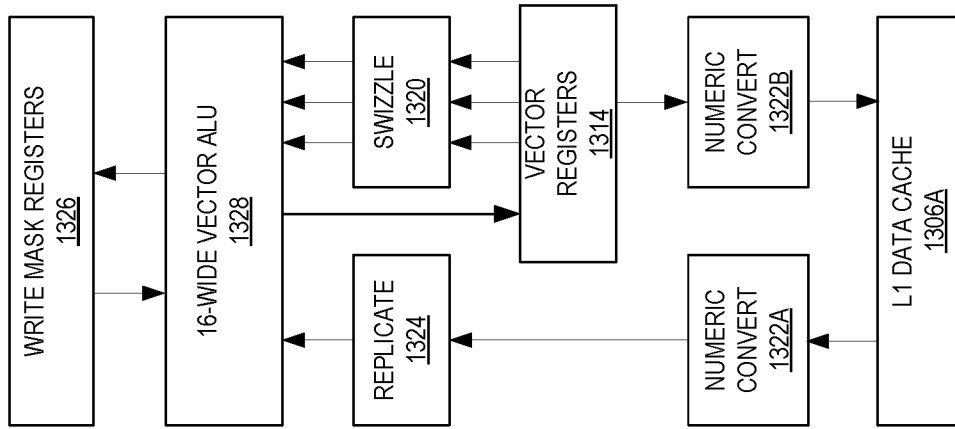
FIG. 13B is an expanded view of part of the processor core in FIG. 13A according to embodiments of the disclosure.
Figure 13A:
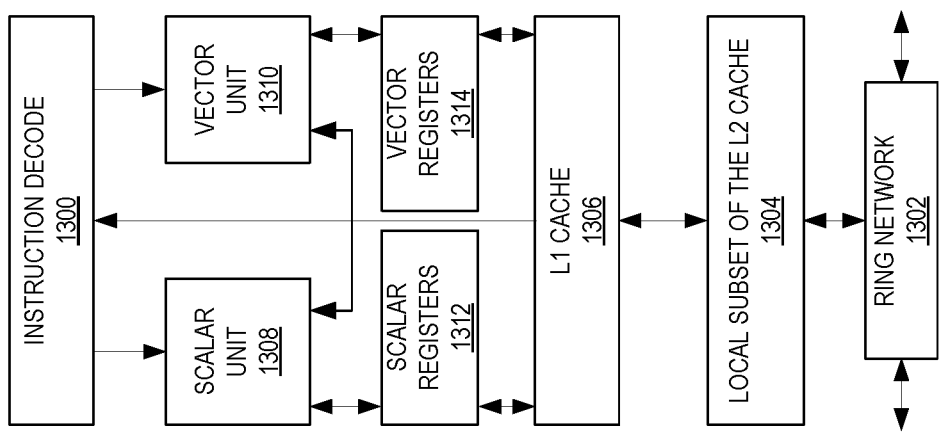
FIG. 13A is a block diagram of a single processor core, along with its connection to the on-die interconnect network and with its local subset of the Level 2 (L2) cache, according to embodiments of the disclosure.

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the disclosure. In one embodiment, an instruction decode unit 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the disclosure may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the disclosure. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
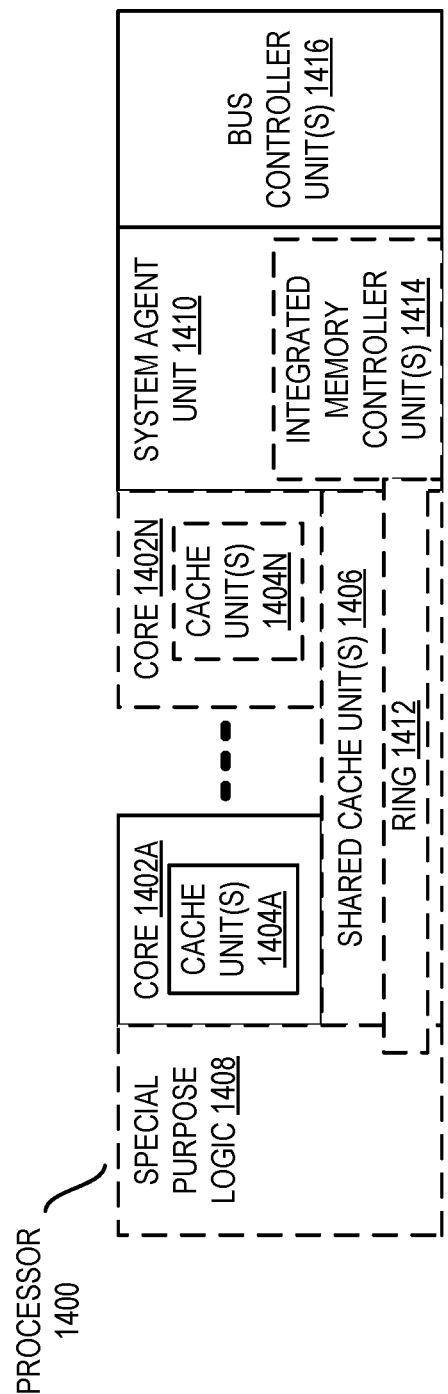
FIG. 14 is a block diagram of a processor that may have more than one core, may have an integrated memory controller, and may have integrated graphics according to embodiments of the disclosure.

FIG. 14 is a block diagram of a processor 1400 that may have more than one core, may have an integrated memory controller, and may have integrated graphics according to embodiments of the disclosure. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multithreading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
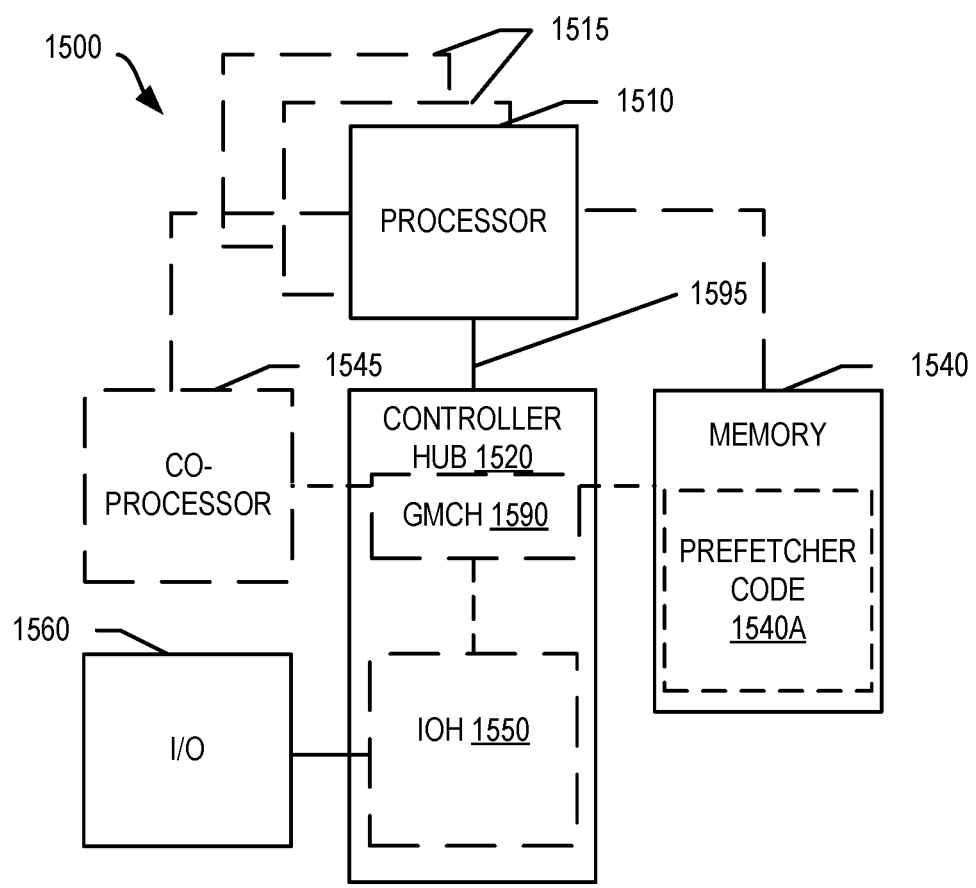
FIG. 15 is a block diagram of a system in accordance with one embodiment of the present disclosure.

Referring now to FIG. 15, shown is a block diagram of a system 1500 in accordance with one embodiment of the present disclosure. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550. Memory 1540 may include prefetcher code 1540A, for example, to store code that when executed causes a processor to perform any method of this disclosure.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as Quickpath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
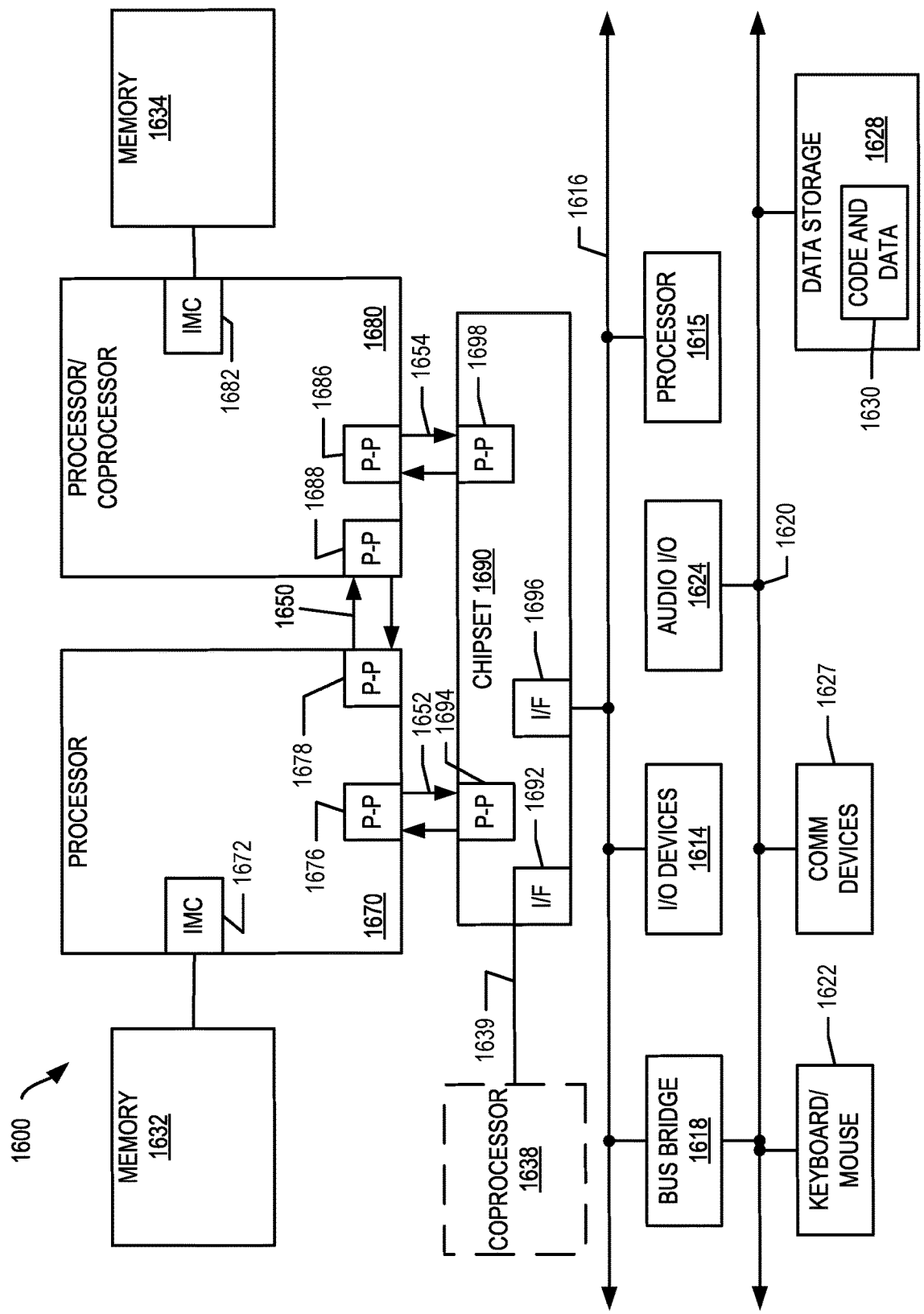
FIG. 16 is a block diagram of a more specific exemplary system in accordance with an embodiment of the present disclosure.

Referring now to FIG. 16, shown is a block diagram of a first more specific exemplary system 1600 in accordance with an embodiment of the present disclosure. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the disclosure, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
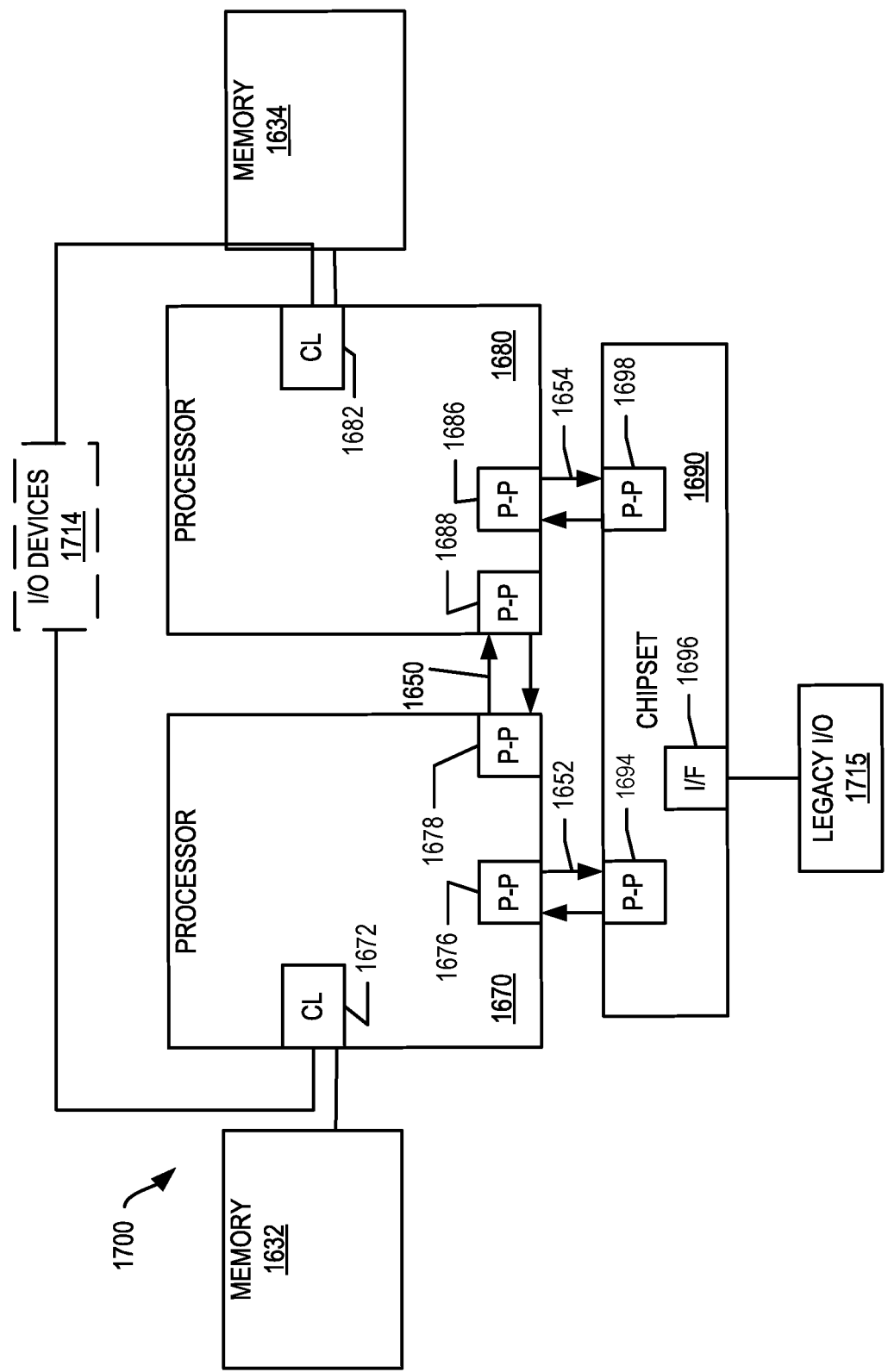
FIG. 17, shown is a block diagram of a second more specific exemplary system in accordance with an embodiment of the present disclosure.

Referring now to FIG. 17, shown is a block diagram of a second more specific exemplary system 1700 in accordance with an embodiment of the present disclosure. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
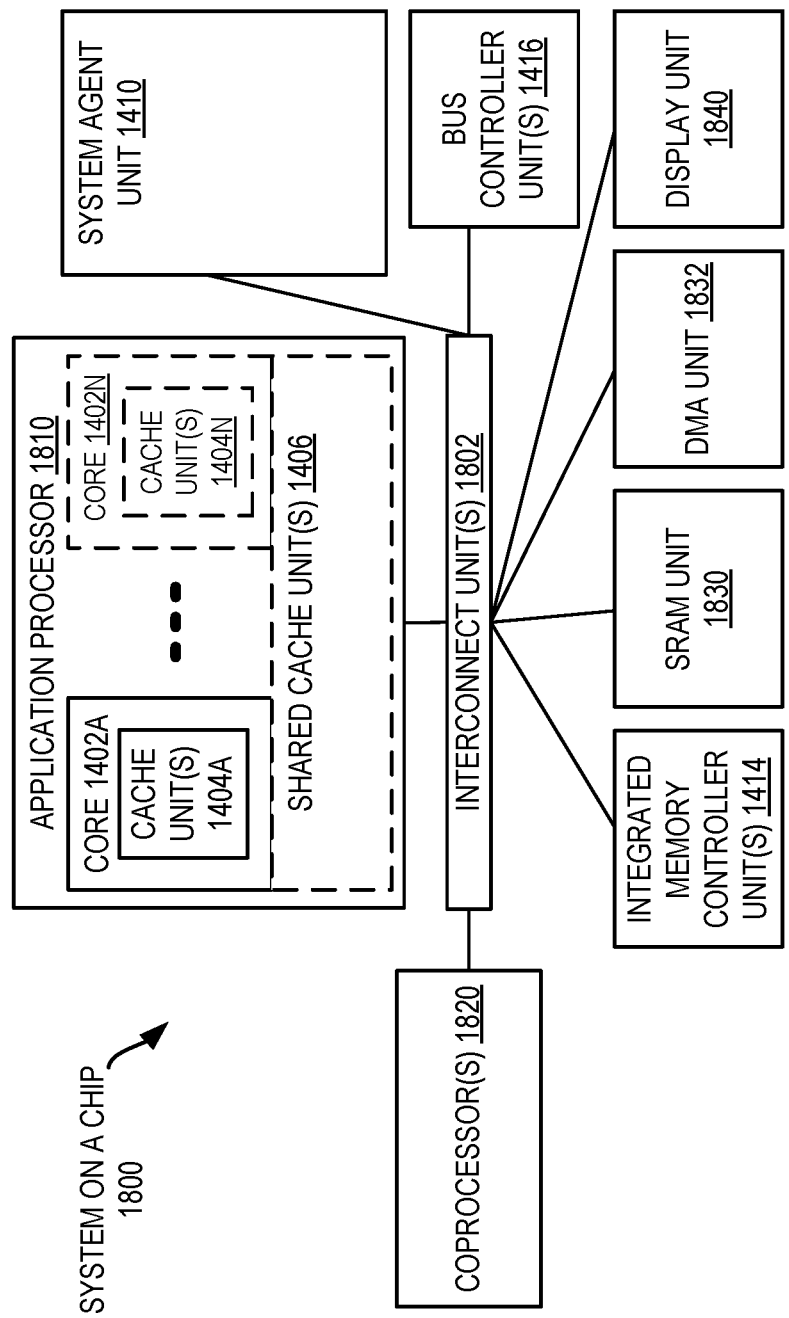
FIG. 18, shown is a block diagram of a system on a chip (SoC) in accordance with an embodiment of the present disclosure.

Referring now to FIG. 18, shown is a block diagram of a SoC 1800 in accordance with an embodiment of the present disclosure. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 202A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
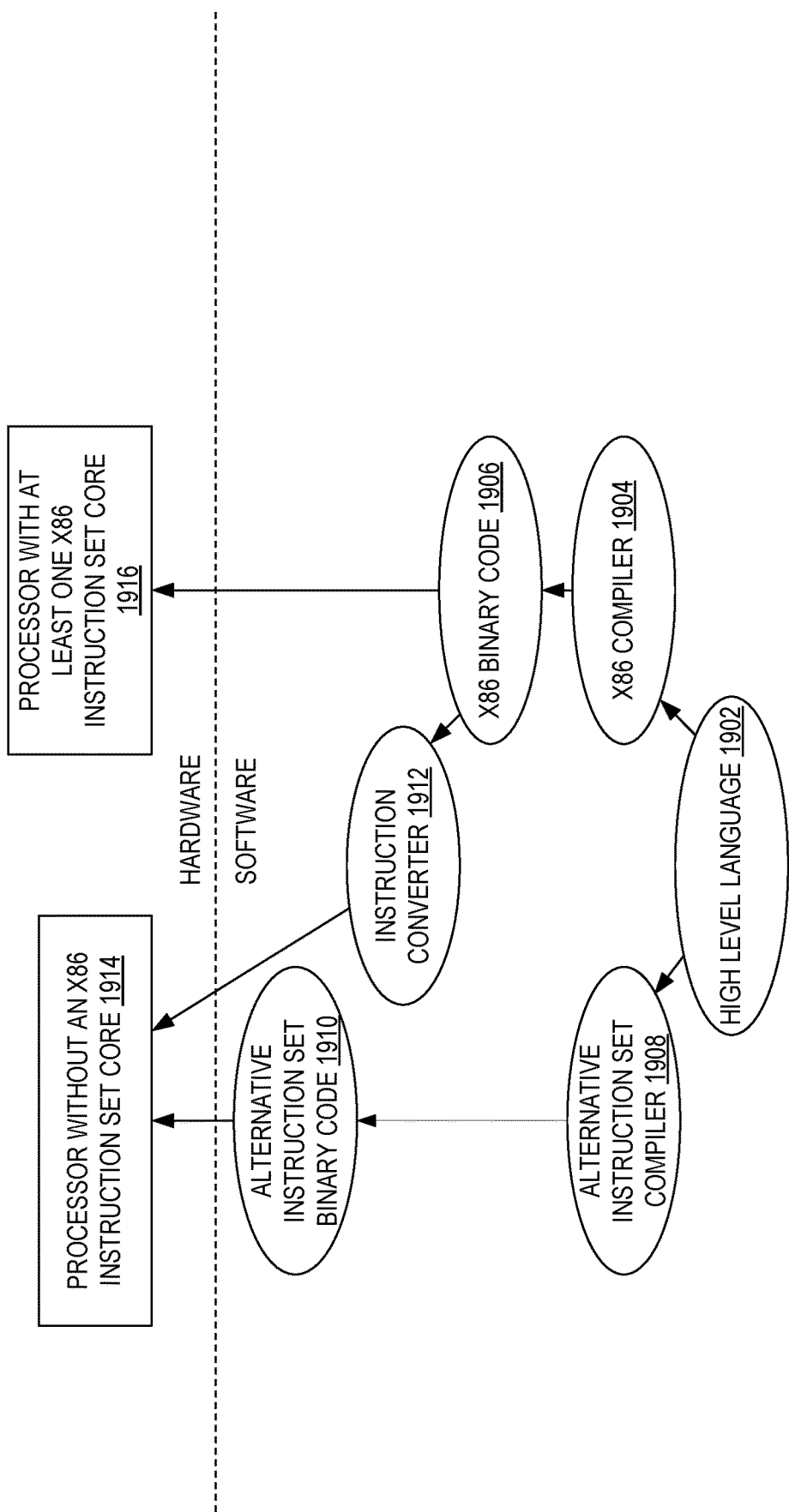
FIG. 19 is a block diagram contrasting the use of a software instruction converter to convert binary instructions in a source instruction set to binary instructions in a target instruction set according to embodiments of the disclosure.

FIG. 19 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, CA and/or that execute the ARM instruction set of ARM Holdings of Sunnyvale, CA). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

What is claimed is:

1. An apparatus comprising:
a processor core to access a memory and a cache that stores cache lines; and
a prefetch circuit to prefetch a cache line into the cache from the memory, wherein the prefetch circuit is to:
track page and cache line accesses to the cache for a single access signature,
generate a spatial bit pattern, for the cache line accesses for each page of a plurality of pages, that is shifted to a first cache line access for each page,
generate a single spatial bit pattern for the single access signature for each of the spatial bit patterns that have a same spatial bit pattern to form a plurality of single spatial bit patterns,
perform a logical OR operation on the plurality of single spatial bit patterns to create a first modulated bit pattern for the single access signature,
perform a logical AND operation on the plurality of single spatial bit patterns to create a second modulated bit pattern for the single access signature,
receive a prefetch request for the single access signature, and
perform a prefetch operation for the prefetch request using the first modulated bit pattern when a threshold is not exceeded and the second modulated bit pattern when the threshold is exceeded.

2. The apparatus of claim 1, wherein the single access signature is a single instruction pointer value.

3. The apparatus of claim 1, wherein the prefetch request comprises a miss of data in the cache.

4. The apparatus of claim 1, wherein the threshold is a bandwidth utilization threshold of the memory.

5. The apparatus of claim 1, wherein the prefetch circuit is further to update the first modulated bit pattern with results of a logical OR operation on the first modulated bit pattern and an actual program access bit pattern for the single access signature.

6. The apparatus of claim 5, wherein the actual program access bit pattern is for a victim page buffer entry.

7. The apparatus of claim 5, wherein the prefetch circuit is further to update the second modulated bit pattern with results of a logical AND operation on the first modulated bit pattern and the actual program access bit pattern for the single access signature.

8. The apparatus of claim 1, wherein the prefetch circuit is further to update the second modulated bit pattern with results of a logical AND operation on the first modulated bit pattern and an actual program access bit pattern for the single access signature.

9. A method comprising:
accessing a cache that stores cache lines by a processor;
tracking page and cache line accesses to the cache for a single access signature;
generating a spatial bit pattern, for the cache line accesses for each page of a plurality of pages, that is shifted to a first cache line access for each page;
generating a single spatial bit pattern for the single access signature for each of the spatial bit patterns that have a same spatial bit pattern to form a plurality of single spatial bit patterns, performing a logical OR operation on the plurality of single spatial bit patterns to create a first modulated bit pattern for the single access signature;
performing a logical AND operation on the plurality of single spatial bit patterns to create a second modulated bit pattern for the single access signature;
receiving a prefetch request for the single access signature; and
performing a prefetch operation, to prefetch a cache line into the cache from a memory, for the prefetch request using the first modulated bit pattern when a threshold is not exceeded and the second modulated bit pattern when the threshold is exceeded.

10. The method of claim 9, wherein the single access signature is a single instruction pointer value.

11. The method of claim 9, wherein the prefetch request comprises a miss of data in the cache.

12. The method of claim 9, further comprising setting the threshold as a bandwidth utilization threshold of the memory.

13. The method of claim 9, further comprising updating the first modulated bit pattern with results of a logical OR operation on the first modulated bit pattern and an actual program access bit pattern for the single access signature.

14. The method of claim 13, wherein the actual program access bit pattern is for a victim page buffer entry.

15. The method of claim 13, further comprising updating the second modulated bit pattern with results of a logical AND operation on the first modulated bit pattern and the actual program access bit pattern for the single access signature.

16. The method of claim 9, further comprising updating the second modulated bit pattern with results of a logical AND operation on the first modulated bit pattern and an actual program access bit pattern for the single access signature.

17. A non-transitory machine readable medium that stores program code that when executed by a machine causes the machine to perform a method comprising:
accessing a cache that stores cache lines by a processor;
tracking page and cache line accesses to the cache for a single access signature;
generating a spatial bit pattern, for the cache line accesses for each page of a plurality of pages, that is shifted to a first cache line access for each page;
generating a single spatial bit pattern for the single access signature for each of the spatial bit patterns that have a same spatial bit pattern to form a plurality of single spatial bit patterns, performing a logical OR operation on the plurality of single spatial bit patterns to create a first modulated bit pattern for the single access signature;
performing a logical AND operation on the plurality of single spatial bit patterns to create a second modulated bit pattern for the single access signature;
receiving a prefetch request for the single access signature; and
performing a prefetch operation, to prefetch a cache line into the cache from a memory, for the prefetch request using the first modulated bit pattern when a threshold is not exceeded and the second modulated bit pattern when the threshold is exceeded.

18. The non-transitory machine readable medium of claim 17, wherein the single access signature is a single instruction pointer value.

19. The non-transitory machine readable medium of claim 17, wherein the prefetch request comprises a miss of data in the cache.

20. The non-transitory machine readable medium of claim 17, further comprising setting the threshold as a bandwidth utilization threshold of the memory.

21. The non-transitory machine readable medium of claim 17, further comprising updating the first modulated bit pattern with results of a logical OR operation on the first modulated bit pattern and an actual program access bit pattern for the single access signature.

22. The non-transitory machine readable medium of claim 21, wherein the actual program access bit pattern is for a victim page buffer entry.

23. The non-transitory machine readable medium of claim 21, further comprising updating the second modulated bit pattern with results of a logical AND operation on the first modulated bit pattern and the actual program access bit pattern for the single access signature.

24. The non-transitory machine readable medium of claim 17, further comprising updating the second modulated bit pattern with results of a logical AND operation on the first modulated bit pattern and an actual program access bit pattern for the single access signature.

* * * * *